United States Patent
Nagata

(10) Patent No.: US 7,933,280 B2
(45) Date of Patent: Apr. 26, 2011

(54) PACKET ROUTING CONTROL METHOD AND SYSTEM

(75) Inventor: Nami Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 216 days.

(21) Appl. No.: 12/181,812

(22) Filed: Jul. 29, 2008

(65) Prior Publication Data

US 2009/0034546 A1 Feb. 5, 2009

(30) Foreign Application Priority Data

Aug. 1, 2007 (JP) ................................ 2007-200733

(51) Int. Cl.
*H04L 12/28* (2006.01)
*H04W 4/00* (2009.01)
(52) U.S. Cl. ....................... 370/401; 370/338; 370/400
(58) Field of Classification Search .................. 370/338, 370/400, 401
See application file for complete search history.

(56) References Cited

U.S. PATENT DOCUMENTS

| 7,107,360 B1 * | 9/2006 | Phadnis et al. ................. 709/250 |
| 2002/0191576 A1 * | 12/2002 | Inoue et al. .................... 370/338 |
| 2004/0063451 A1 * | 4/2004 | Bonta et al. .................... 455/519 |

OTHER PUBLICATIONS

Hideya Muramatsu, et al., "Proposal of Shared Multilink Procedures Based on Mobile IP," 64th General Meeting (2002) of Information Processing Society of Japan, pp. 3-565-3-566.

* cited by examiner

*Primary Examiner* — Pankaj Kumar
*Assistant Examiner* — Saba Tsegaye
(74) *Attorney, Agent, or Firm* — Greer, Burns & Crain, Ltd.

(57) ABSTRACT

A wireless communication system downloads information from a file server using multiple wireless communication paths. When a destination requests data from a file server through a wireless terminal, the wireless terminal generates an address translation rule that includes source, translation and destination addresses used to route the data from the file server to the destination through a virtual network server. The address translation rule is sent to at least one other wireless terminal, so that retrieved data packets can be routed through both wireless terminals simultaneously. A packet retrieved from the file server is sent to the virtual network server, where the packet is encapsulated into multiple packets and assigned virtual addresses. The encapsulated packets are sent to the multiple wireless terminals, and are sent from those terminals to the destination using the address translation rule, where the packets are decapsulated to reproduce the originally sent packet.

9 Claims, 24 Drawing Sheets

FIG. 4

| DESTINATION ADDRESS | NETMASK | GATEWAY | INTERFACE | METRIC |
|---|---|---|---|---|
| MN2 (Remote) | DEPEND ON ITEM ON LEFT COLUMN | MN2 (Local) | MN1 (Local) | * |
| MN3 (Remote) | DEPEND ON ITEM ON LEFT COLUMN | MN3 (Local) | MN1 (Local) | * |
| LOCAL NETWORK | DEPEND ON ITEM ON LEFT COLUMN | MN1 (Local) | MN1 (Local) | * |
| ● ● ● ● ● | DEPEND ON ITEM ON LEFT COLUMN | MN1 (Remote) | MN1 (Remote) | * |

FIG. 5

| DESTINATION ADDRESS | NETMASK | GATEWAY | INTERFACE | METRIC |
|---|---|---|---|---|
| MN1 (Remote) | DEPEND ON ITEM ON LEFT COLUMN | MN1 (Local) | MN2 (Local) | * |
| MN3 (Remote) | DEPEND ON ITEM ON LEFT COLUMN | MN3 (Local) | MN2 (Local) | * |
| LOCAL NETWORK | DEPEND ON ITEM ON LEFT COLUMN | MN2 (Local) | MN2 (Local) | * |
| ● ● ● ● ● | DEPEND ON ITEM ON LEFT COLUMN | MN2 (Remote) | MN2 (Remote) | * |

FIG. 7

| DESTINATION ADDRESS | NETMASK | GATEWAY | INTERFACE | METRIC |
|---|---|---|---|---|
| LOCAL NETWORK (REGISTERED AGGREGATION DESTINATION) | DEPEND ON ITEM ON LEFT COLUMN | DISTRIBUTED TO MN1 (REMOTE) AND MN2 (REMOTE) ACCORDING TO CERTAIN RATE | DISTRIBUTED TO MN1 (REMOTE) AND MN2 (REMOTE) ACCORDING TO CERTAIN RATE | * |
| DEFAULT | DEPEND ON ITEM ON LEFT COLUMN | DEFAULT (INTERNET SIDE) INTERFACE | DEFAULT (INTERNET SIDE) INTERFACE | * |

FIG. 10

| ADDRESS AND PORT TRANSLATION RULE (T2) | | | | | |
|---|---|---|---|---|---|
| SOURCE | | AFTER TRANSLATION | | DESTINATION | |
| IP ADDRESS | PORT NUMBER | IP ADDRESS | PORT NUMBER | IP ADDRESS | PORT NUMBER |
| Local adrs X:1234 | xxxxx | VPN clnt 1:2345 | yyyyy | File server:3456 | zzzzz |
| 1001 | 1002 | 1003 | 1004 | 1005 | 1006 |

PACKET ROUTING CONTROL METHOD AND SYSTEM

TECHNICAL FIELD

This invention relates to a packet routing control method, a packet routing control program, a terminal device, and a virtual private network (VPN) server wherein a plurality of communication paths are set by applying a VPN connection between a VPN server in a remote network and a plurality of terminal devices in a local network, and integrating the routes to a target terminal device.

BACKGROUND

Recently, opportunities to use various services and access contents through an information device with a wireless interface (communication device) such as a mobile phone have been increasing. However, the wireless network used for such opportunities intrinsically does not provide stable quality, and the bandwidth is generally narrow compared with a wired communication network. Therefore, currently such communication does not always operate seamlessly.

Under these circumstances, technologies to virtually increase bandwidth by using a plurality of peripheral wireless devices are being studied. For example, In one method, a plurality of routes via a plurality of terminals connected to a network by using Mobile IPv4 are bundled, and packets are distributed in each path and aggregated at a Home Agent (HA), thereby virtually increasing bandwidth.

However, this technology has a problem of packet header overhead because it requires IP tunneling by Mobile Internet Protocol (IP) up to the HA where packets are distributed and aggregated upstream in the public network, and further requires more IP tunneling to transfer the packets to another wireless terminal nearby.

More specifically, when a wireless terminal in a local network transmits a packet to a Correspondent Node (CN) in a remote network via a wireless terminal, there is a problem of superimposing encapsulation; that is, performing encapsulation for IP tunneling of Mobile IP and further performing encapsulation for IP tunneling to transfer packets from one wireless terminal to the other wireless terminal.

As Mobile IP itself does not provide sufficient security functions, for example, when trying to ensure security by using VPN (Virtual Private Network), encapsulation for IP (Internet Protocol) tunneling of VPN is further required, resulting in increase of packet overhead. This means, there is a trade-off relation between ensuring security and reducing overhead.

In order to solve these problems, the typical technology distributes and integrates routes by a VPN server. The basic operating principle will be explained by using an example of downstream route integration (CN→wireless terminal MN). In the following explanations, the name of an encapsulated packet gives "( )" to the numeric part (ex. encapsulated packet P1=packet P(1)).

FIG. 19 is an explanatory drawing illustrating an exemplary configuration of conventional integration of a plurality of routes. In FIG. 19, transmissions from CN (e.g., file server 102) to a wireless terminal MN2 are distributed through three routes via wireless terminal MN1 and MN3 and integrated. The wireless terminals MN1 to MN3 have two or more communication interfaces such as wireless LAN, PHS, PC, or 3G, and form a local network connected, for example, by a wireless ad-hoc LAN.

It is assumed that the file server 102 and a VPN server 101 are in a remote network, and the wireless terminals MN1 to MN3 can be connected to the VPN server 101. A VPN connection from Wireless terminals MN1 to MN3 to the file server 102 is applied by using a PHS (or PDC, 3G, etc.) network. When a VPN connection from the wireless terminal MN1 to MN3 to the file server 102 is applied, a packet transmission from the file server 102 to the wireless terminal MN2 is considered. The destination address of a packet 1900 transmitted from the file server 102 is a VPN address of the wireless terminal MN2.

The packet 1900 is encapsulated at the VPN server 101. The address is a global address assigned to PHS (global) interface of the wireless terminal MN2, and the packet 1900 is transmitted as packets 1900-(1) to 1900-(3). After that, the packets from 1900-(1) to 1900-(3) are decapsulated and a packet address which is a VPN address is received at the VPN virtual interfaces.

When transmitting packets 1900-(1) to 1900-(3) from the file server 102 to the wireless terminal MN2 via the wireless terminals MN1 and MN3, the destination address for encapsulating (the destination address after encapsulation) the packet 1900 transmitted from the file server 102 to the VPN server 101 are changed to global addresses of wireless terminals MN1, MN2, and MN3 respectively according to a specific rule.

The packets 1900-(1) to 1900-(3), the destination of which are changed to wireless terminal MN1, MN2, and MN3 respectively, are transmitted to the wireless terminals MN1, MN2, and MN3 respectively. The wireless terminals MN1, MN2, and MN3 decapsulate the packet respectively, and packets 1900-1 to 1900-3, destinations of which are VPN addresses of the wireless terminal MN2, are obtained.

At this time, setting routing of the wireless terminal MN1 and the wireless terminal MN3 to transfer packets to a wireless LAN interface of the wireless terminal MN2 when the address is a VPN address of the wireless terminal MN2, causes packets 1900-1 and 1900-3 to be directed to the VPN address of the wireless terminal MN2 which arrived at the wireless terminals MN1 and MN3 to be transferred to the wireless terminal MN2 via the wireless LAN.

Using this route integration system configured with the VPN server 101 and a plurality of VPN clients, integration of a plurality of routes for devices such as a laptop computer with wireless LAN without implementing any special application will be explained.

FIG. 20 shows an exemplary network configuration in which connection is made from a laptop computer in a local area network to a remote network by way of a wireless terminal serving as a gateway. When connection to the file server 102 is made from a laptop computer to the wireless terminal MN via the wireless terminal MN, the wireless terminal MN can be regarded as a gateway (GW) from the local area network which includes the laptop PC to the external network. Since a private address is used in the local network, Network Address Translation (NAT) function is required.

IP addresses of the same subnet should be assigned to the laptop computers, and a wireless terminal MN is set as a default gateway. Based on this environment, applying the conventional system for integrating routes is considered.

FIGS. 21 and 22 show an exemplary routing control when integration of a plurality of routes are applied to the configuration shown in FIG. 20. In FIGS. 21 and 22, packets are once integrated to the wireless terminal MN1 serving as a GW for the wireless terminal MN3, and then transferred to the wireless terminal MN3. First, an example of control for the upper stream shown in FIG. 21 (from the wireless terminal MN3 to the File server 102) will be explained.

In FIG. 21, the wireless terminal MN3 requests data transfer from the file server 102. The destination address Dst of a packet P1 transmitted from the wireless terminal MN3 is an address of the file server 102, and the source address Src is a local (private) address of the wireless terminal MN3.

When the packet P1 passes through the wireless terminal MN1, the source address of the packet P1 is translated to the VPN address of the wireless terminal MN1 by NAT and the packet P1 turns into a packet P2. The address translation rule at this time is stored in the wireless terminal MN1. Then the packet P2 is encapsulated at the wireless terminal MN 1. The VPN server 101 decapsulates the packet P (2). Then the packet P2 decapsulated from the packet P (2) ultimately arrives at the file server 102.

Now an example of control for downstream (from File server 102 to Laptop PC) operation shown in FIG. 22 will be explained. The destination address of a packet P3 transferred from the file server 102 by return is the VPN address of the wireless terminal MN1. The packet P3 is encapsulated at the VPN server 101 so that the address after encapsulation includes the global addresses of either the wireless terminals MN1 or MN2. The encapsulated packets are P (3-1), and P (3-2) respectively. The Packets P (3-1) and P (3-2) are transferred from the VPN server 101 to the wireless terminal MN1 and MN2 respectively.

The packet P (3-1) at the wireless terminal MN1 is decapsulated at the wireless terminal MN1, and a packet P3-1 is obtained. The packet P (3-2) at the wireless terminal MN2 is decapsulated. The decapsulated packet P3-2 is transferred to the wireless terminal MN1 according to a predetermined routing setting. The packets P3-1 and P3-2 are addressed to the VPN address of the wireless terminal MN1, and after arrival at the wireless terminal MN1, are transferred to the wireless terminal MN3 as a packet P4, after translating the source address Src of the packet P3-1, and P3-2 into the address of the wireless terminal MN3 according to the stored address translation rule.

However, each of the packets P (3-1) and P (3-2) are transferred to the wireless terminal MN3 always by way of the wireless terminal MN1 in order to apply address translation according to the address translation rule. Therefore, the load to the wireless terminal MN1 increases and causes delay in each process in the wireless terminal 1 and increases power consumption as well.

This typical technology uses a wireless LAN network for 1 hop more compared with transferring packets directly from the wireless terminal MN2 to the wireless terminal MN3, and this redundant transfer may reduce End-to-end throughput if terminals using the same channel increase.

Although it is desirable to transfer packets directly from the wireless terminal MN2 to the wireless terminal MN3 to prevent this problem, passing through the wireless terminal MN1 is required in the current method because the destination addresses Dst of packet P3-1 and P3-2 after decapsulation are the VPN address of the wireless terminal MN1.

SUMMARY

According to the present embodiments, a packet routing control method, wherein a local network in which a plurality of terminal devices equipped with a communication device for local and external networks are provided and a remote network in which a VPN server and a file server exist are VPN-connected, thereby setting a communication path between the file server and a specific terminal device equipped only with a communication device for the local network includes the following processes.

A terminal device designated as a gateway among the plurality of terminal devices receives a packet from the specific terminal device.

The source address of the packet is the local address of the specific terminal device and a destination address of the packet is an IP address of the file server.

The terminal device translates a source address described in a header of the received packet from the local address of the specific terminal device to the VPN address of the terminal device.

The terminal device stores an address translation rule linking the local address, the VPN address and the IP address of the file server.

The terminal device forwards the address translation rule to another terminal device except for the terminal device designated as a gateway among the plurality of terminal devices. It also forwards global addresses of the terminal device and another terminal device except for the terminal device designated as a gateway to the VPN server.

The file server responds to the packet, and the VPN server receives a packet in which the source address is an IP address of the file server. The destination address is the VPN address.

The packet is distributed to each of the global addresses, and is encapsulated by using a header in which the source address is the IP address of the VPN server and the destination address is the global address, respectively.

When the terminal device and the above mentioned another terminal device receive encapsulated packets respectively, the received packet is decapsulated.

The terminal device and the above mentioned another terminal device reversely translate the destination address described in the header of the decapsulated packets from the VPN address to the local address.

The terminal device and above mentioned another terminal device transmit the packet in which the destination address has been changed to the local address by reverse translation to the specific terminal device.

BRIEF DESCRIPTION OF THE DRAWINGS

FIG. 4 shows a routing table of the wireless terminal MN1;

FIG. 5 shows a routing table of the wireless terminal MN2;

FIG. 7 shows a routing table of the VPN server;

FIG. 10 is an explanatory diagram showing an address and port translation rule for the second embodiment;

DESCRIPTION OF THE EMBODIMENTS

The First Embodiment

The first embodiment explains integrating communication paths of packets transmitted from the file server 102 (communication partner of a wireless terminal MN3) to the wireless terminal MN3, by providing a first communication path (the file server 102—the VPN server 101—a wireless terminal MN1—the wireless terminal MN3) and a second communication path (the file server 102—the VPN server 101—the wireless terminal MN2—the wireless terminal MN3). This is achieved by sending an address translation rule table T1 generated by the wireless terminal MN1 serving as a gateway for the wireless terminal MN3 (laptop PC) to the wireless terminal MN2.

The second communication paths are set as needed for the number of wireless terminals MN2. This enables virtual increase in the bandwidth available for downstream transmission without imposing an undue load on the wireless terminal (the wireless terminal MN1) serving as a gateway.

Figure 1:
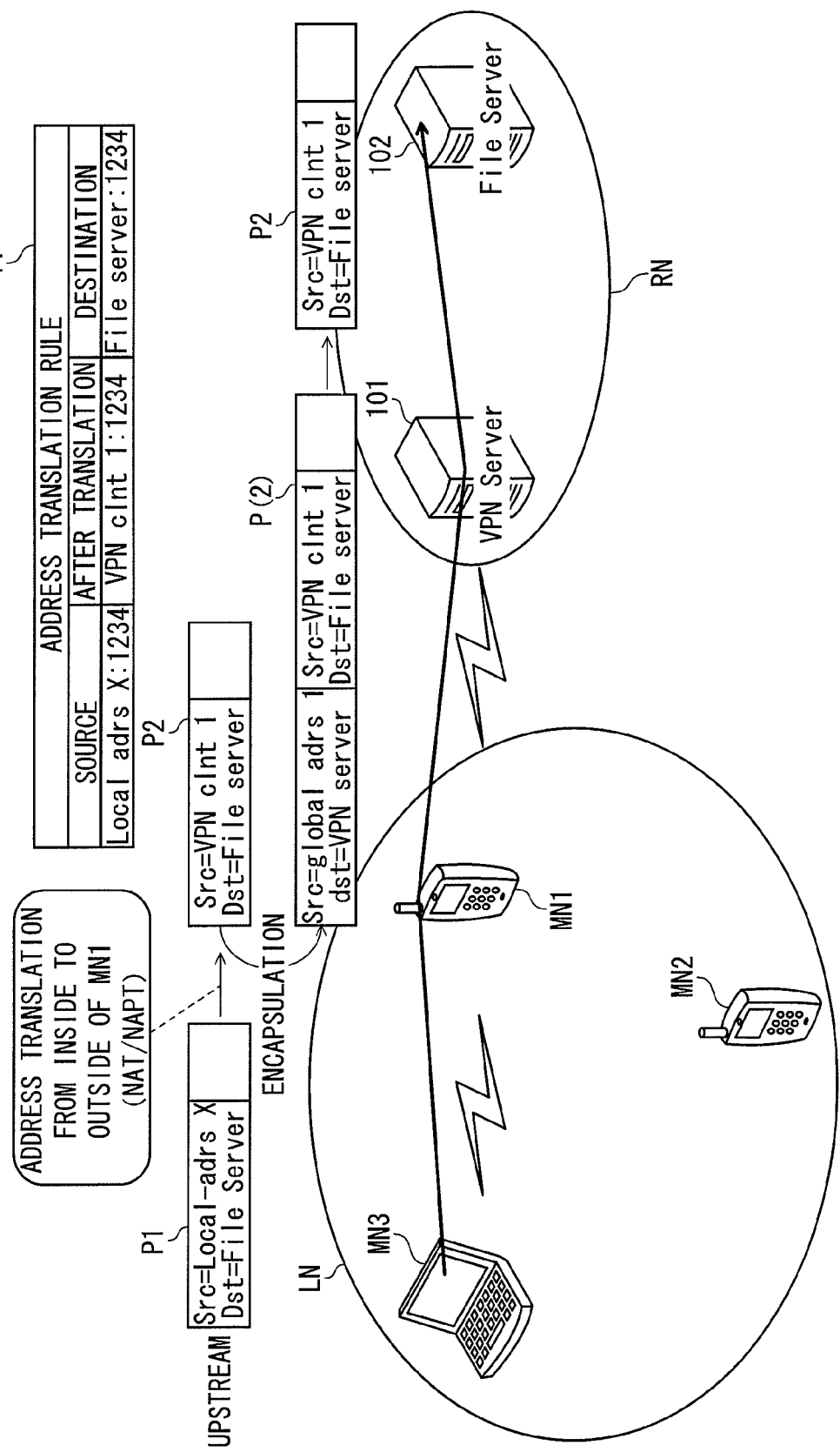
FIG. 1 shows an upstream routing control method for the first embodiment.
Figure 2:
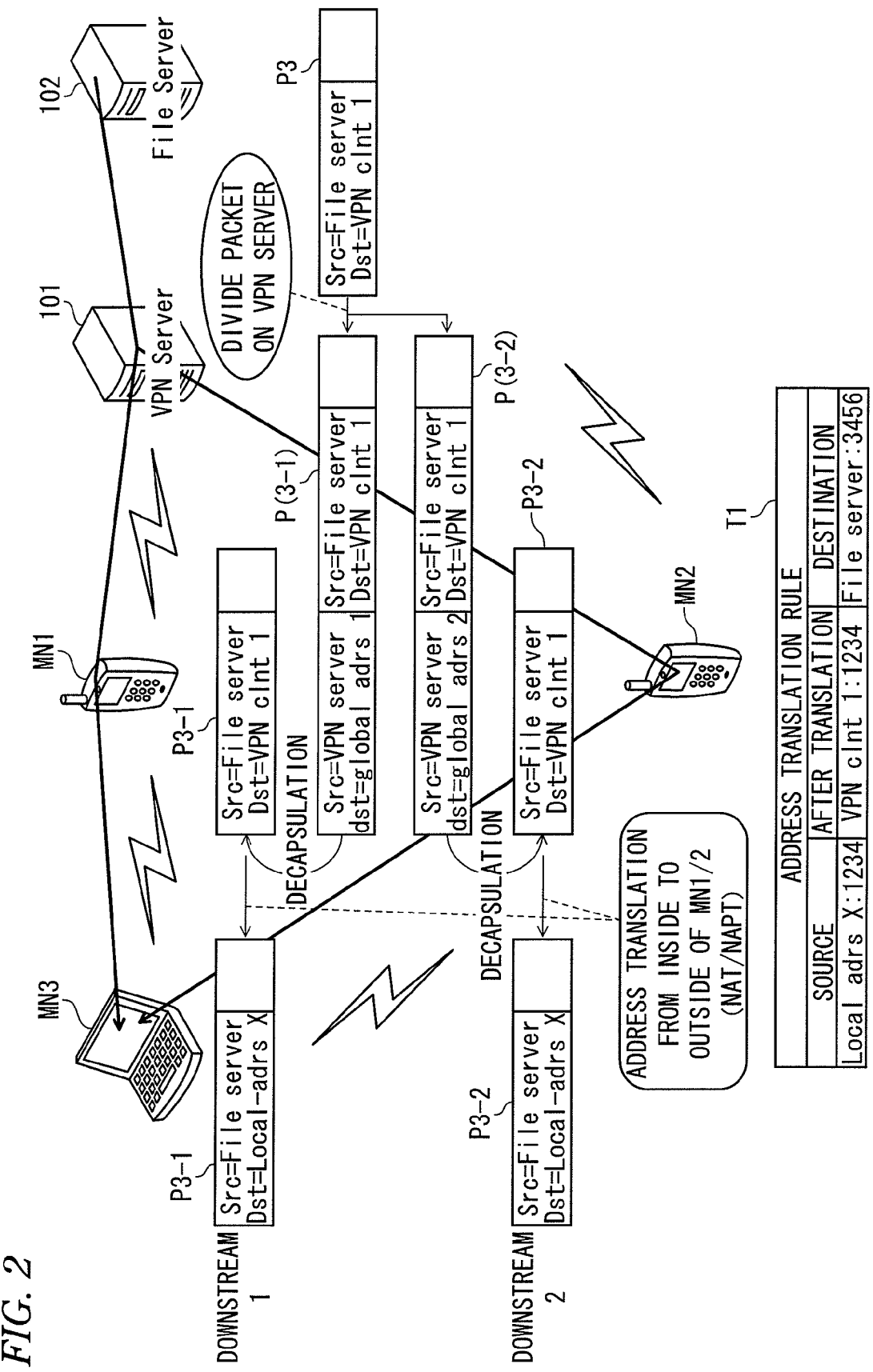
FIG. 2 shows a downstream routing control method for the first embodiment.
Figure 20:
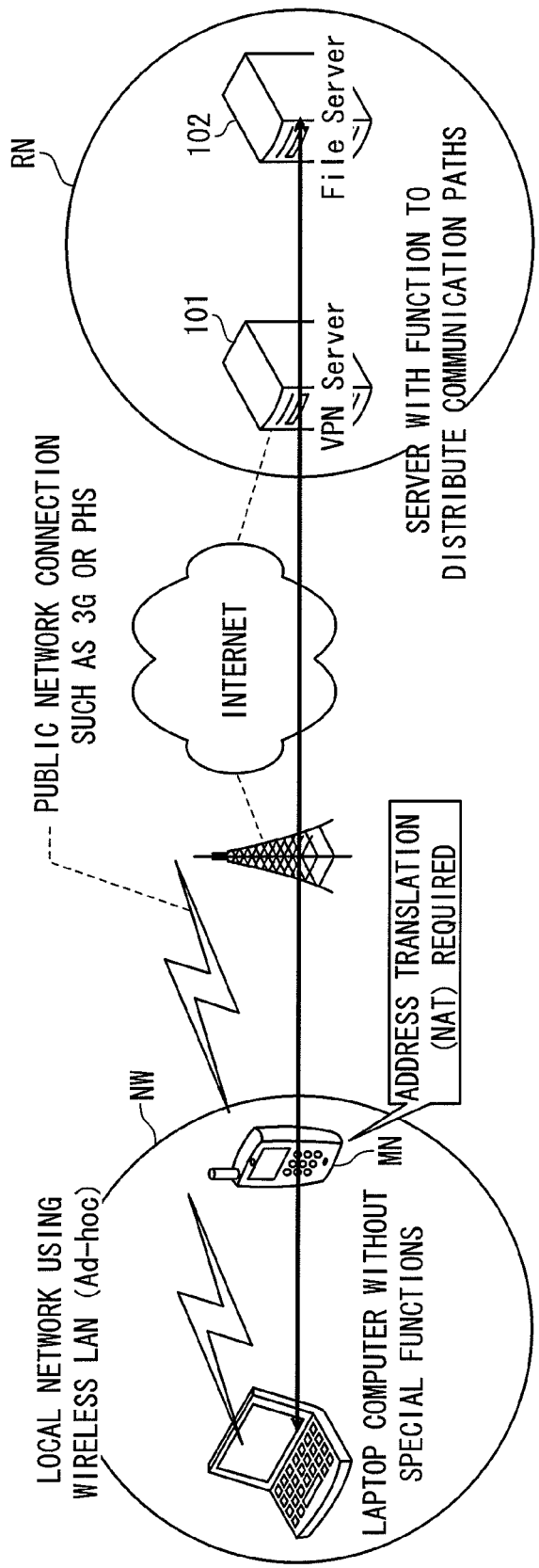
FIG. 20 shows an exemplary network configuration in which connection is made from a laptop computer in a local area network to a remote network via a wireless terminal serving as a gateway.
Figure 21:
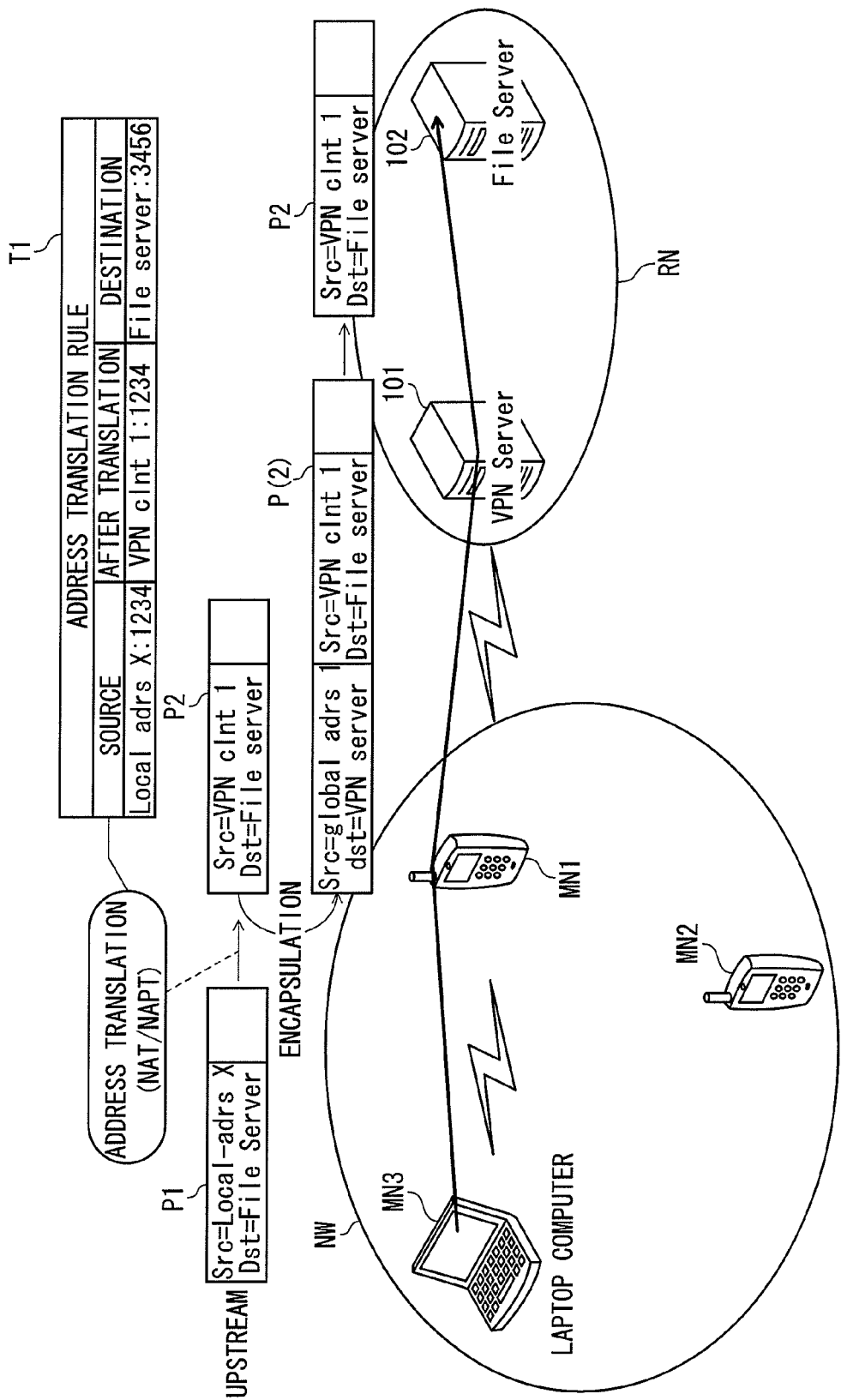
FIG. 21 shows an upstream exemplary routing control when integration of a plurality of routes are applied to the configuration shown in FIG. 20.
Figure 22:
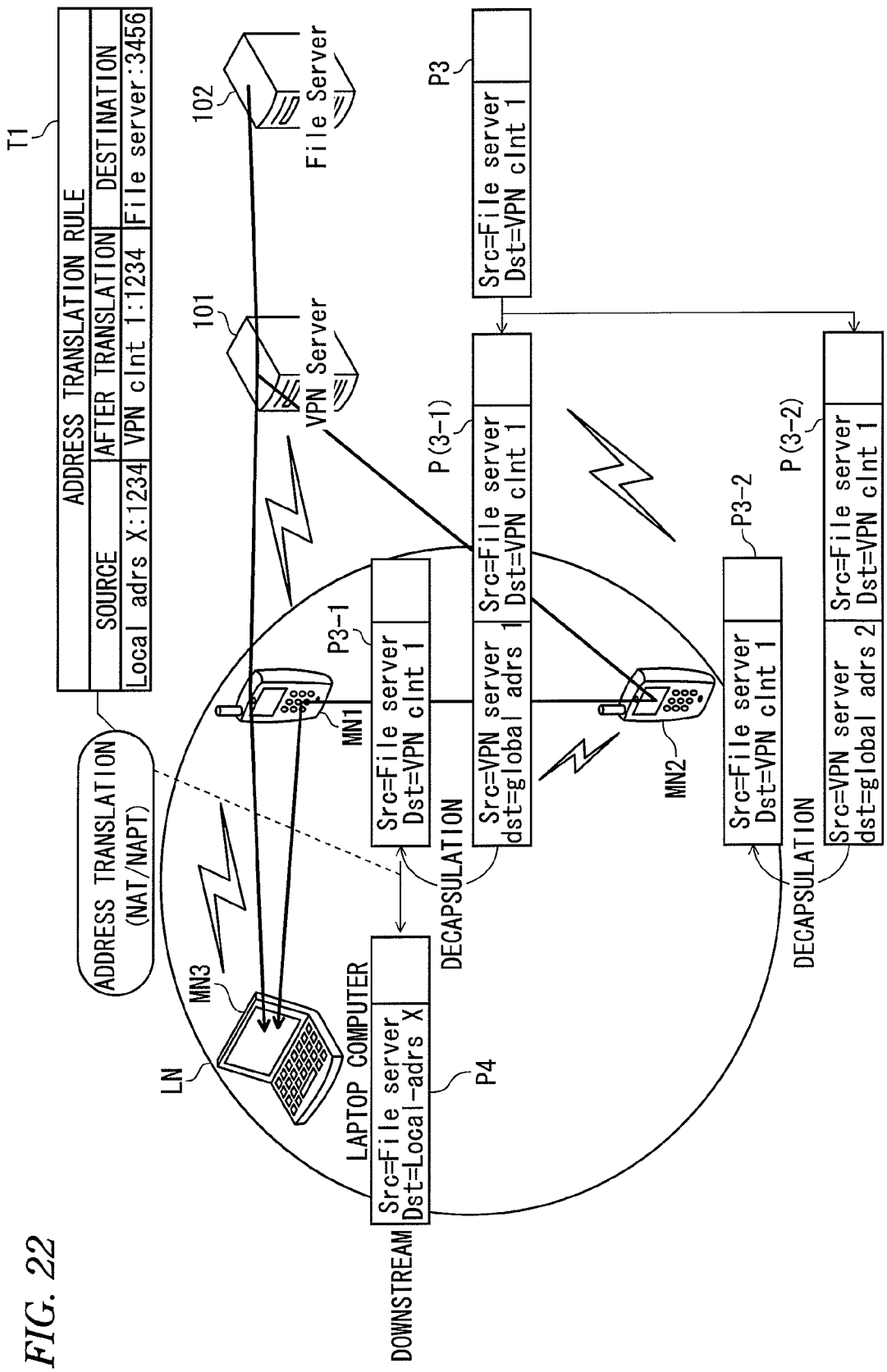
FIG. 22 shows an exemplary downstream routing control when integration of a plurality of routes are applied to the configuration shown in FIG. 20.

FIGS. 1 and 2 show a routing control method (upstream and downstream respectively). As shown in FIG. 2, the file server 102 initiates data transfer in response to a data transfer request from the wireless terminal MN3 (refer to FIG. 1), and the packet P3 is distributed to the wireless terminals MN1 and MN2 by the VPN server 101 and decapsulated at the wireless terminals MN1 and MN2. Up to here, the operations are the same as conventional operations shown in FIGS. 20 and 21.

Subsequently, in FIG. 2, the wireless terminal MN1 creates and stores an address translation rule table T1. The address translation rule table T1 will be explained here. The address translation rule table T1 links a local address (Local-adrs X) described as the source address in the header of a packet from the wireless terminal MN3, the VPN address (VPN clnt) of the wireless terminal MN1 described as the source address Src after address translation by NAT, and the destination address Dst (File Server).

A packet P3-1 is decapsulated after applying address translation according to the address translation rule table T1 created and stored when wireless terminal MN3 is connected to the file server 102, and then the packet is transferred to the wireless terminal MN3. The address translation rule table T1 stored in the wireless terminal MN1 is sent to the wireless terminal MN2 as well.

This enables transfer of a packet P3-2 from the wireless terminal MN2 to the wireless terminal MN3 after translating the destination address Dst from the VPN address of wireless terminal MN1 to the local address of the wireless terminal MN3. Since the address after the translation is the local address, the packet P3-2 is transferred to and arrives at the wireless terminal MN3 via local (wireless LAN) interface to which the local address is assigned.

(Functional Configuration of the Wireless Terminals MN1 and MN2)

Figure 3:
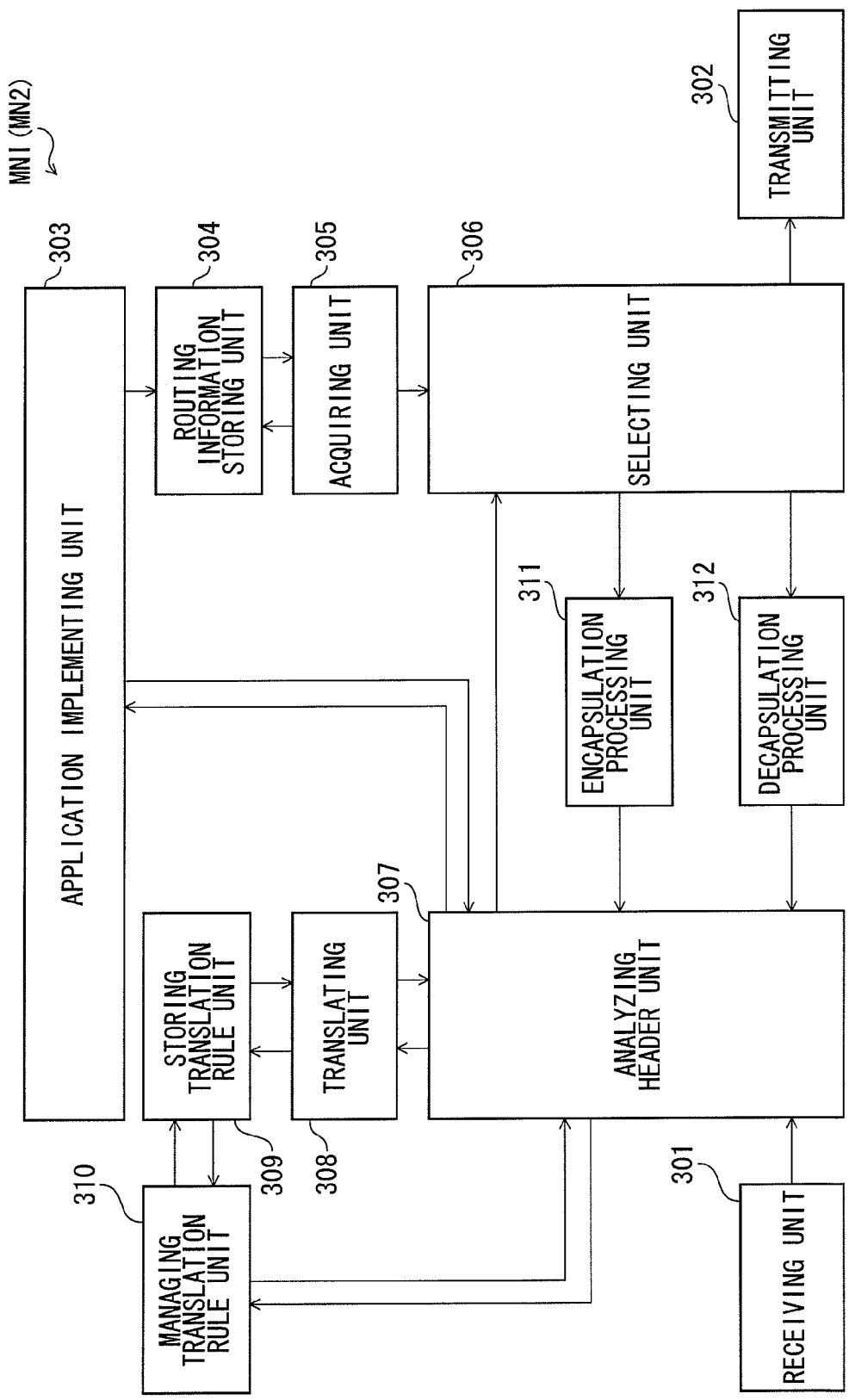
FIG. 3 shows a functional configuration of wireless terminals MN1 and MN2.

Next, the functional configuration of the wireless terminals MN1 and MN2 according to the first embodiment will be explained. FIG. 3 shows a functional configuration of wireless terminals MN1 and MN2. In FIG. 3, the wireless terminal MN1 and MN2 have a receiving unit 301, a transmitting unit 302, an application implementing unit 303, a routing information storing unit 304, an acquiring unit 305, a selecting unit 306, an analyzing header unit 307, a translating unit 308, a storing translation rule unit 309, and a managing translation rule unit 310, a encapsulation processing unit 311, and a decapsulation processing unit 312 respectively. Hereunder, for the purpose of the explanation, the wireless terminal MN1 will be explained. The same explanation applies to the wireless terminal MN2 as well.

First, the receiving unit 301 receives packets from outside. The transmitting unit 302 transmits packets to the outside. More specifically, such function is realized, for example, by an interface (a communication device) within the wireless terminal MN1. Such interface can be selected from a local (wireless LAN) interface, and an interface for an external network (e.g., Cell Phone).

The application implementing unit 303 sets a routing table by a routing protocol. The routing table can be set statically or dynamically. The application implementing unit 303, when the terminal itself is designated as a gateway, sends the global address or a VPN address to the VPN server 101. The VPN address is the address virtually assigned when connecting to the VPN.

Since the wireless terminal MN1 is designated as a gateway, a global address (global adrs 1) and a VPN address (VPN clnt 1) of the wireless terminal MN1 are sent. When sending these addresses, a header is added in which the source is the wireless terminal MN1 and the destination is the VPN server 101 and the addresses are transmitted from the transmitting unit 302 via the analyzing header unit 307 and the selecting unit 306. This distributes the global address (global adrs 1) and the VPN address (VPN clnt 1) of the wireless terminal MN1.

The global address and VPN address of other wireless terminal MN2 within the same local network LN can be sent from the wireless terminal MN1 as well. In this case, the wireless terminal MN2 within the same network LN is detected and then the global address (global adrs 2) and VPN address (VPN clnt 2) are sent by the wireless terminal MN2. The global address (global adrs 1, global adrs 2) and the VPN address (VPN clnt 2) are sent to the VPN server 101 by the same process as above.

The routing information storing unit 304 stores a routing table obtained by the application implementing unit 303. The routing table is a memory table storing the routing information regarding destinations of packets.

FIG. 4 shows the routing table of the wireless terminal 1. The "Remote" in FIG. 4 indicates the VPN address of the wireless terminal MN1, while the "Local" indicates the local address of the wireless terminal MN1.

For example, the first line in FIG. 4 indicates routing information from the wireless terminal MN1 to the wireless terminal MN2. The gateway which indicates the actual destination is the local address of the wireless terminal MN2.

The third line in FIG. 4 indicates the routing information from the wireless terminal MN1 to the local network LN. The gateway which indicates the actual destination is the local address of the wireless terminal MN1.

The fourth line of FIG. 4 indicates the routing information from the wireless terminal MN1 to the remote network RN. The gateway which indicates the actual destination is the local address of the interface for the external network (e.g., Cell Phone)

In this case, the wireless terminal MN1 serves as a gateway for the local network LN. FIG. 5 is an explanatory diagram illustrating the routing table of the wireless terminal MN 2. The routing information storing unit 304 performs the storage function by storage devices such as a memory or a hard disk within the wireless terminal MN1 or the wireless terminal MN 2.

In FIG. 3, the acquiring unit 305 reads the routing table from the routing information storing unit 304 in response to an instruction from the selecting unit 306. The read routing table is transmitted to the selecting unit 306. When transmitting a packet, the selecting unit 306 selects an interface by referring to the routing table. More specifically, the address described in "gateway" on the routing table is assumed to be the destination, and the interface described in "interface" is selected. The analyzing header unit 307 analyzes a header of a packet received at the receiving unit 301. More specifically, the analyzing header unit 307 identifies the source address Src and the destination address Dst of the header.

The translating unit 308 translates a source address. More specifically, the source address is translated (for example, from a local network LN address (private address) to the VPN address assigned to the wireless terminal MN1). This generates the address translation rule table T1 shown in FIGS. 1 and 2. Conversely, the source address is translated from the VPN address assigned to the wireless terminal MN1 to the local network LN address (private address).

The storing translation rule unit 309 stores an address translation rule table T1. The address translation rule table T1 is a memory table (translation table) storing the address translation rule table T1. The managing translation rule unit 310 sends the address translation rule table T1 to the wireless terminal MN2 within the same local network LN (wireless LAN).

The encapsulation processing unit 311 encapsulates the received packet. For example, as shown in FIG. 1, the encapsulation processing unit 311 encapsulates a packet P2 by applying the header wherein the source address Src is the global address (Src=global adrs1) of the wireless terminal MN1, and the destination address Dst is the VPN server 101 (Dst=VPN server). Since the destination address Dst of the encapsulated packet P(2) is the address of the VPN server 101, the encapsulated packet P(2) is transmitted to the VPN server 101.

The decapsulation processing unit 312 decapsulates the received packet. For example, as shown in FIG. 2, the packet P (3-1) is decapsulated by removing the header in which the source address Src is the address of the VPN server 101 (Dst=VPN server), and the destination address Dst is the global address of the wireless terminal MN1 (Src=global adrs1).

Since the destination address Dst of the decapsulated packet P3-1 is the VPN address (Dst=VPN clnt 1) of the gateway (wireless terminal MN1), the address is translated to the local address (Local-adrs X) by the address translation rule table T1. This enables transmission of the packet P3-1 from the wireless terminal MN1 serving as a gateway to the wireless terminal MN3, and the packet P3-2 can be directly transmitted to the wireless terminal MN3 as well.

The managing translation rule unit 310 manages the address translation rule table T1. More specifically, the managing translation rule unit 310 reads the address translation rule table T1 stored in the storing translation rule unit 309 and sends it to the wireless terminal MN2 within the same local network LN. When sending the rule, a header in which the source address is the wireless terminal MN1, and the destination address is the wireless terminal MN2 is added to the read address translation rule table T1. Then the rule table T1 is transmitted from the transmitting unit 302 via the selecting unit 306.

The application implementing unit 303, the acquiring unit 305, the selecting unit 306, the analyzing header unit 307, the translating unit 308, the managing address translation unit 310, the encapsulation processing unit 311, and the processing decapsulation 312 all perform their functions by causing a CPU or LSI to execute programs stored in a storage device such as a memory or a hard disk of the wireless terminals MN1 and MN2.

(Functional Configuration of the VPN Server 101)

Figure 6:
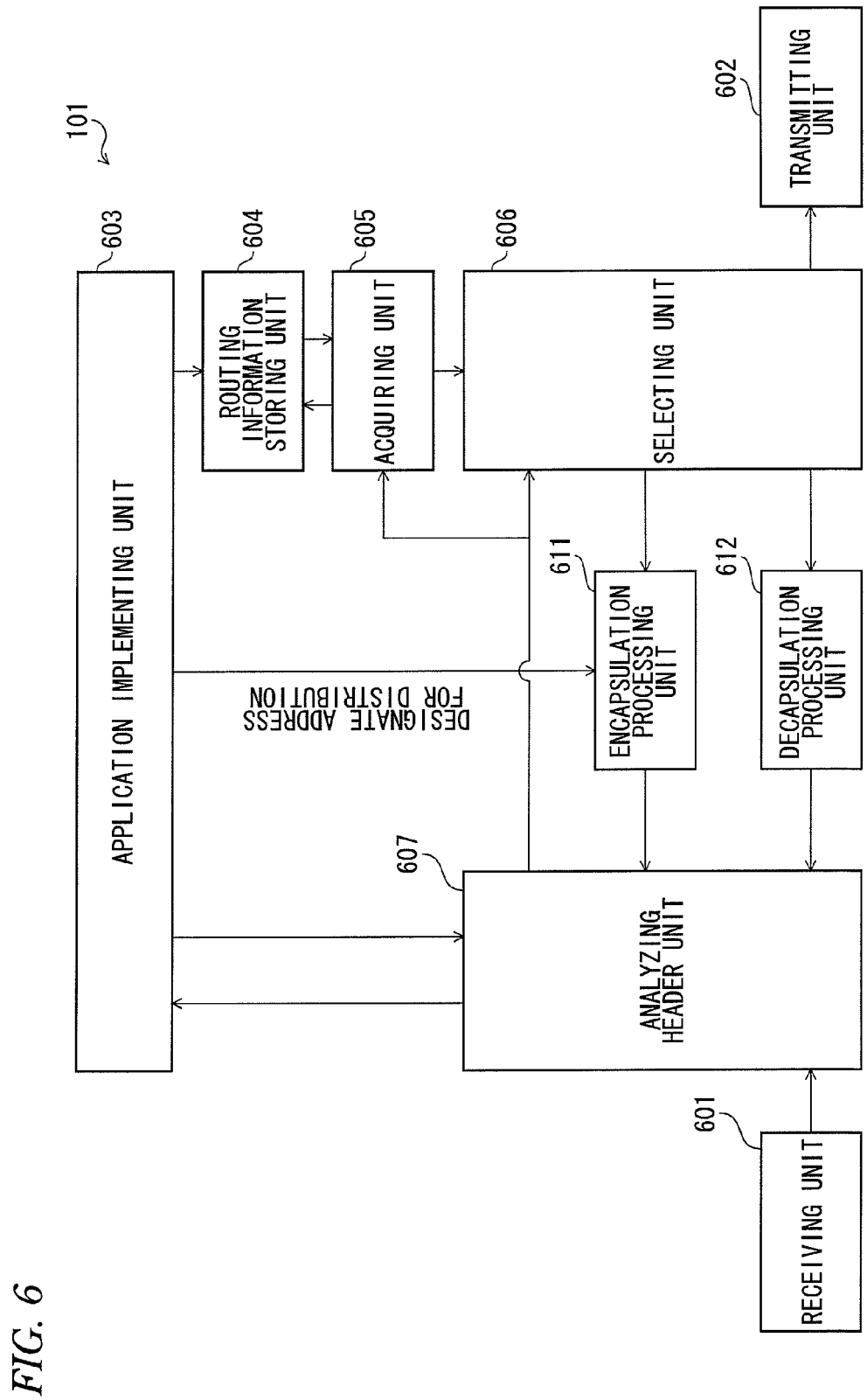
FIG. 6 shows a functional configuration of a VPN server.

Next, the functional configuration of the VPN server 101 will be explained. FIG. 6 is a block diagram of the VPN server 101. The VPN server 101 in FIG. 6 includes a computer to provide a VPN connection between a remote network RN and a local network LN. The VPN server 101 has a receiving unit 601, a transmitting unit 602, an application implementing unit 603, routing information storing unit 604, an acquiring unit 605, a selecting unit 606, an analyzing header unit 607, an encapsulation processing unit 611, and a decapsulation processing unit 612.

First the receiving unit 601 receives packets from outside. The transmitting unit 602 transmits packets to outside. For example, this function can be enabled by an interface within the VPN server 101. Such interface can be selected from a remote interface or an interface for an external network.

The application implementing unit 603 supplies the global addresses sent by the wireless terminal MN1 and MN2 to the encapsulation processing unit 611. Such addresses are used as a destination for the data taken from the file server 102 by a request from the wireless terminal MN3. The application implementing unit 603 updates the routing table with the VPN addresses of the wireless terminal MN1 and MN2 (VPN clnt 1, VPN clnt 2) received from the wireless terminals MN1 and MN2. The updated routing table is stored in the routing information storing unit 604.

The routing information storing unit 604 stores the routing table obtained by the application implementing unit 603. The routing table is a memory table storing the routing information regarding a destination of a packet.

FIG. 7 shows a routing table for the VPN server 101. The routing information storing unit 604 performs the storing function by storage devices such as a memory or a hard disk within the wireless terminal MN1 or the wireless terminal MN 2.

In FIG. 6, the acquiring unit 605 reads the routing table from the routing information storing unit 604 in response to an instruction by the selecting unit 606. The read routing table is transmitted to the selecting unit 606. When transmitting a packet, the selecting unit 606 selects a gateway and an interface by referring to the above routing table. More specifically, the "gateway" on the routing table is assumed to be the destination, and the interface described in the "interface" is selected.

The analyzing header unit 607 analyzes the header of the packet received at the receiving unit 601. More specifically, a source address Src and a destination address Dst of the header are identified.

The encapsulation processing unit 611 encapsulates a packet received in the downstream process. By referring to the routing table, the encapsulation processing unit 611 distributes packets transmitted by the file server 102 in time division to the VPN address received from the local network LN and encapsulates each of the distributed packets.

For example, as shown in FIG. 2, when a packet P3 is received from the file server 102, the gateway in the routing table is referred to. Since the VPN addresses of the wireless terminals MN1 and MN2 are written in the routing table T1, the packet P3 is distributed to the wireless terminal MN1 and MN2. Then the distributed packets P3-1 and P3-2 are encapsulated.

When encapsulating, the packet P3-1 is encapsulated by applying a header in which the source address Src is the address of the file server 102 (Src=File server), and the destination address Dst is the global address of the wireless terminal MN1 (Src=global adrs1). Since the destination address Dst of the encapsulated packet P(3-1) is the global address of the wireless terminal MN1 (Src=global adrs1), it is transmitted to the wireless terminal MN1.

Similarly, the packet P3-2 is encapsulated by applying a header in which the source address Src is the address of the file server 102 (Src=File server), and the destination address Dst is the global address of the wireless terminal MN2 (Src=global adrs2). Since the destination address Dst of the encapsulated packet P(3-2) is the global address of the wireless terminal MN2 (Src=global adrs2), it is transmitted to the wireless terminal MN2.

The decapsulation processing unit 612 decapsulates a packet received in the upstream process. For example, as shown in FIG. 1, the packet P (2) is decapsulated by removing the header in which the source address Src is the global address of the wireless terminal MN1 (Src=global adrs1), and the destination address Dst is the VPN server 101 (Dst=VPN server). The decapsultated packet P2 is transferred to the file server 102 to which the decapsulated packet P2 is addressed.

The application implementing unit 603, the acquiring unit 605, the selecting unit 606, the analyzing header unit 607, the encapsulation processing unit 611, and the processing decapsulation unit 612 all perform their functions by causing a CPU or LSI to execute programs stored in a storage device such as a memory or a hard disk of the VPN server.

(Processing Procedures of the Wireless Terminals MN1 and MN2)

Figure 8A:
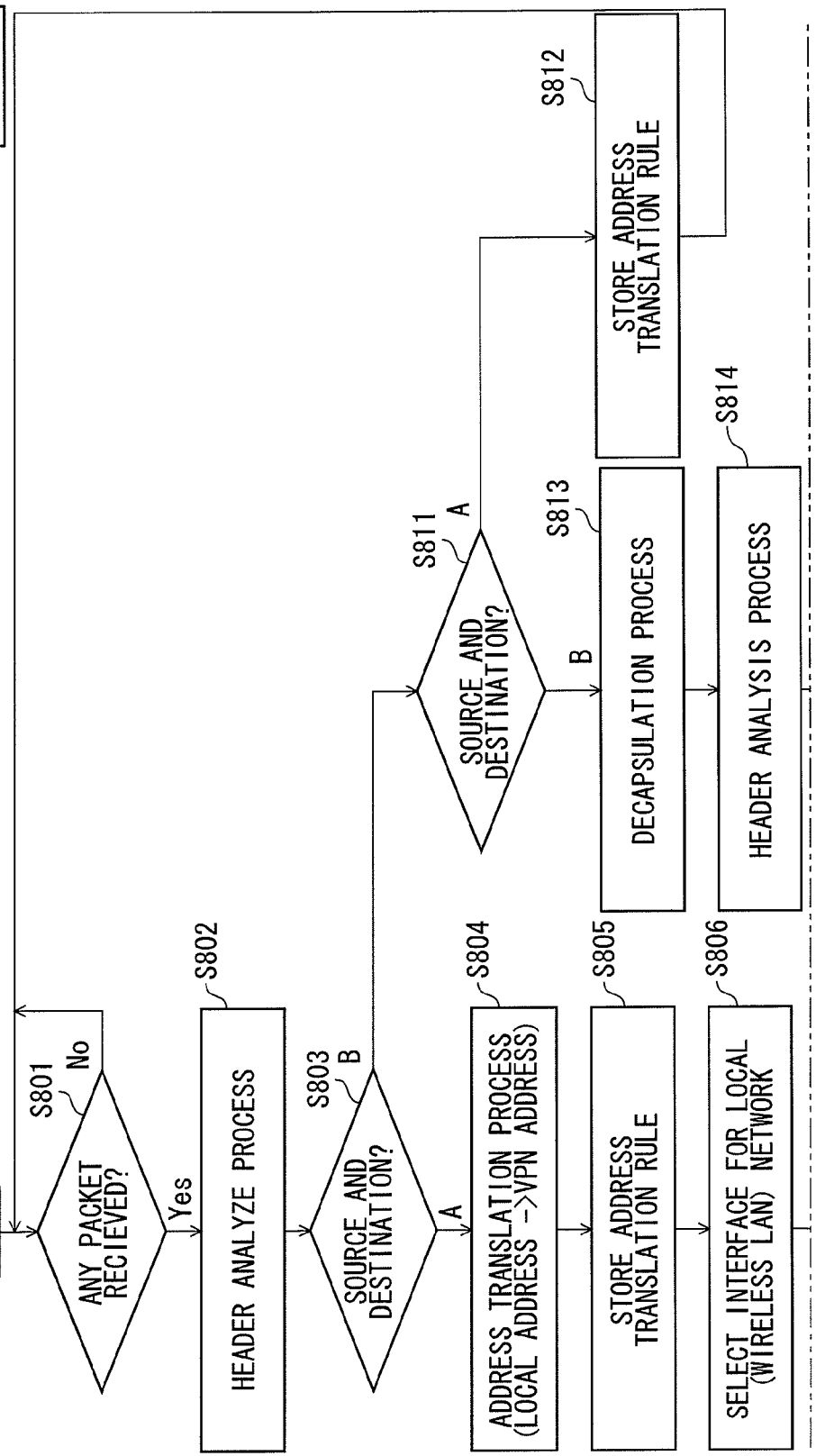
FIG. 8 is a flow chart showing processing procedures of wireless terminals MN1 and MN2 for the first embodiment.
Figure 8B:
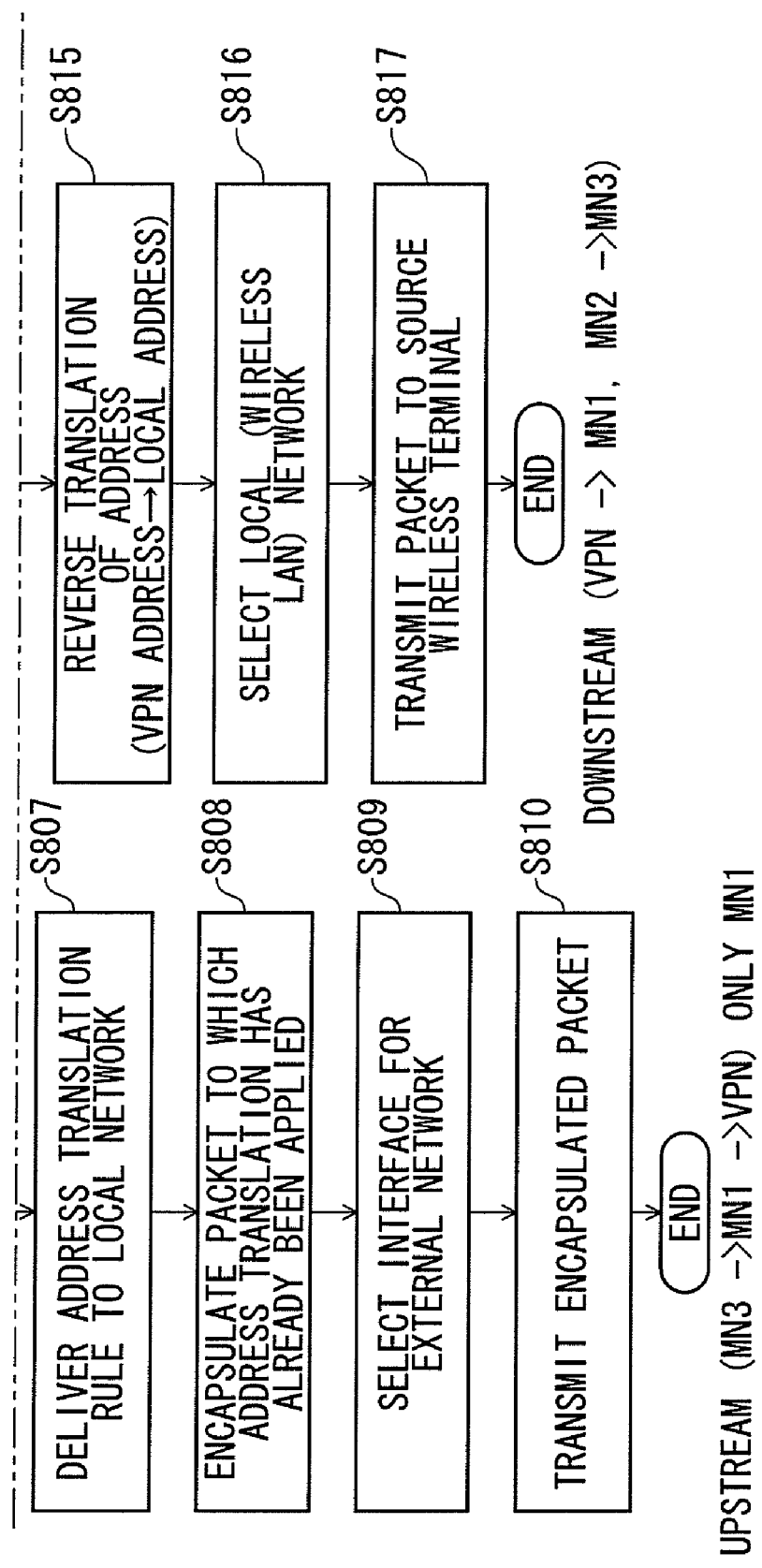

Next, the processing procedures of the wireless terminal MN1 and MN2 will be explained. FIG. 8 is a flow chart showing processing procedures of the wireless terminals MN1 and MN2. In FIG. 8, first, whether any packet is received or not is determined (step S801) When packets can not be received (step S801: No), the wireless terminals MN1 and MN2 stand by until any packet is received.

When a packet can be received (step S801: Yes), the header of the packet is analyzed (step S802). When the analysis reveals that the source is the wireless terminal MN3 and the destination is the file server 102 of the remote network RN (Step S803:A), then the operation transits to Step S804. Otherwise (step S803: B), it transits to Step S811.

The steps S804 to S810 are the upstream processing procedure of the wireless terminal MN1 designated as a gateway (MN1→VPN server 101), whereas steps S811, and S813 to S817 are the downstream processing procedures of the wireless terminal MN1 and MN2 (VPN server 101→MN1, MN2).

The loop of steps S801 to S803, S811, S812, and S801 are the processing procedures of the wireless terminal MN2 when the address translation rule table T1 receives address information from the wireless terminal MN1 serving as a gateway. First, steps S804 to S810 will be explained.

When the header analysis in the step S803 reveals that the source is the wireless terminal MN3 and the destination is the file server 102 in the remote network RN (Step S803: A), the address translation by NAT is executed (Step S804). This stores the address translation rule table T1 linking the source addresses Src before and after the translation, and the destination address Dst (Step 805).

After that, a local interface is selected (step S806) by referring to the routing table, and then the address translation rule table T1 can be notified about the wireless terminal MN2 by distributing the address translation rule table T1 to the local network LN (step S807)

Then, encapsulation is applied to the packet P2 to which the address translation has already been applied (step S808) and a packet P (2) is obtained. When the header of the packet P(2) is referred to, since the destination is the VPN server 101, the selecting unit 606 selects an interface for an external network (step S809) and transmits the encapsulated packet P(2) to the VPN server 101 (step S810). This completes the series of upstream processing procedures.

Now, the loop to notify the address translation rule table T1 will be described. When the header analysis at step S803 reveals that the source is the wireless terminal MN3 and the destination is not the file server 102 in the remote network RN (Step S803:B), the source and the destination are checked (step S811).

When the source is a gateway (the wireless terminal MN1) and the destination is the terminal itself (wireless terminal MN2) (step S811: A), the transmitted packet is the address translation rule table T1 from the gateway (wireless terminal MN1), and the updated address translation rule table T1 is stored (step S812) Then the operation returns to step S801.

Finally, the downstream process will be explained. In step S811, when the source is the VPN server 101 and the destination is the global address of the terminal itself (the wireless terminal MN1 and MN2) (step S811:B), then the decapsulation process is executed for the packets P (3-1), and P(3-2) (step S813).

Then the headers of the decapsulated packets P3-1 and P3-2 are analyzed (step S814), and the address translation process is executed using the address translation rule table T1 (step S815). As a result of this, the decapsulated packets P3-1 and P3-2 are changed to packets P4-1 and P4-2 wherein the source address Src is the address of the file server 102 (Src=File server), and the destination address Dst is the local address of the wireless terminal MN3 (Dst=Local-adrs X), respectively.

After that, since the destinations of headers of packet P4-1 and P4-2 are the wireless terminal MN3, a local interface is selected (step S816). The packet 4-1 for the wireless terminal 4-1 and the packet P4-2 for the wireless terminal MN2 are transmitted to the wireless terminal MN3 respectively (step S817). This completes the series of the downstream procedures.

(Processing Procedures of the VPN Server 101)

Figure 9:
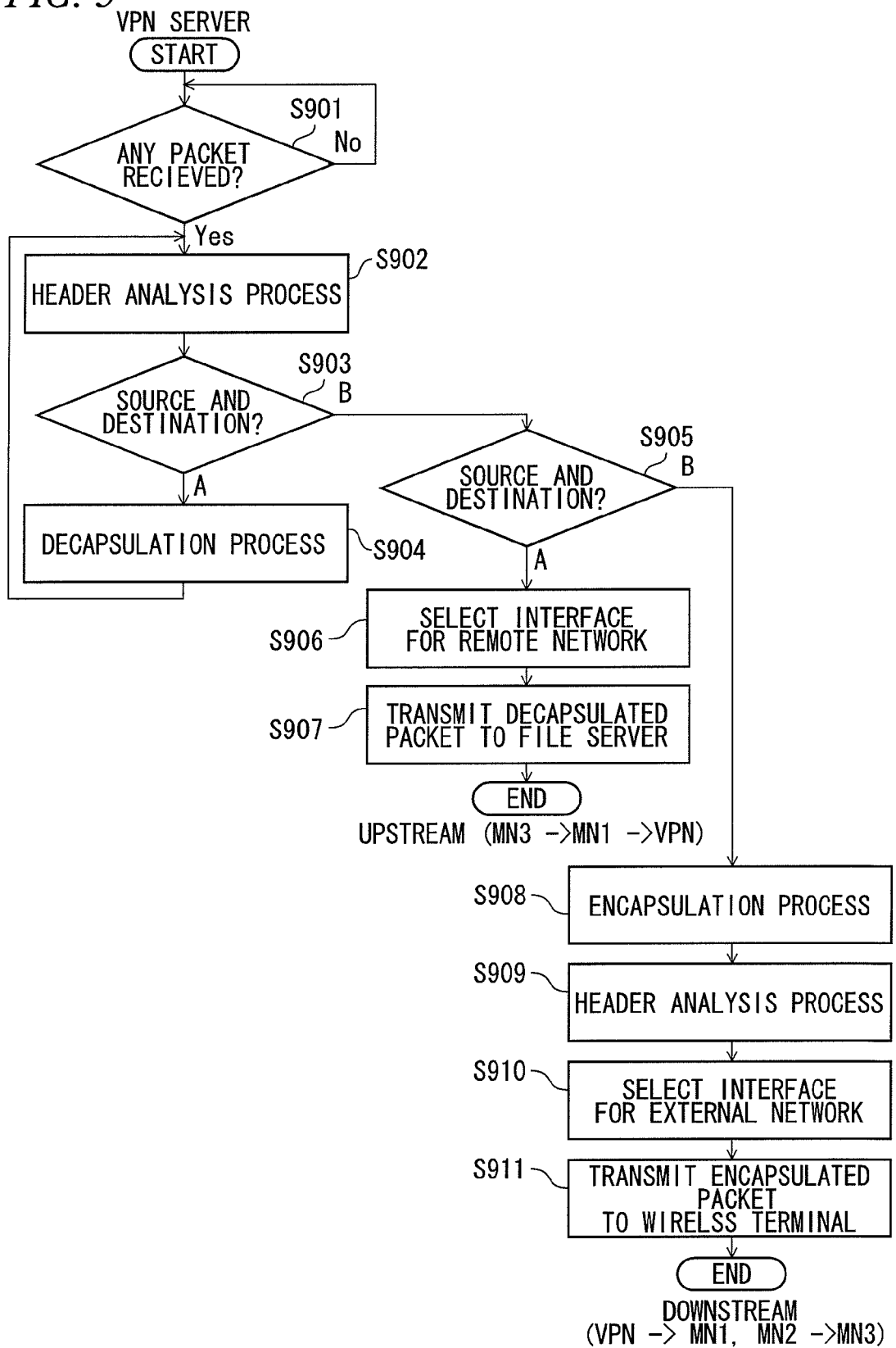
FIG. 9 is a flow chart showing processing procedures of the VPN server of the first embodiment.

The processing procedures of the VPN server 101 will now be explained. FIG. 9 is a flow chart showing processing procedures of the VPN server 101. In FIG. 9, first, whether any packet is received or not is determined (step S901). When no packet is received (step S901: No), the VPN server 101 stands by until a packet is received.

When a packet is received (step S901: Yes), the header is analyzed (step S902). When the header analysis reveals that the source address Src is a global address of the gateway (the wireless terminal MN1), and the destination address Dst is the address of the VPN server 101 (step S 903:A), since the packet P(2) is encapsulated, decapsulation is executed (step S904) Then, the operation returns to the step S902.

When the source address Src is a global address of the gateway (the wireless terminal MN1), and the destination address Dst is not the address of the VPN server 101 (step S903:B), the operation transits to the step S905. The step S905 to step S907 are the upstream procedure, whereas the step S905 and the step S908 to step S911 are the downstream procedure. First, the upstream procedure of the steps S905 to S907 will be explained.

In the step S905, the source address Src is the global address of the wireless terminal MN1 which is a gateway, and the destination address Dst is the address of the file server 102 (step S905: A), since the packet P2 is the request for the file server 102, an interface for a remote network is selected (step S906), and the packet P2 decapsulated at the step S904 is transmitted to the file server 102 (step S907). This completes the upstream procedures.

Next, the downstream procedure of step S905, and steps S908 to S911 will be explained. In the step S905, the source address Src is the address of the file server 102, and the destination address Dst is the VPN address of the wireless terminal MN1 serving as a gateway (step S905: B). Since the packet P3 is the data requested by the wireless terminal MN3 via the gateway (wireless terminal MN1), the routing table is referenced, and encapsulation is executed by distributing the packet P3 (Step S908).

Then the headers of encapsulated packets P (3-1), and P (3-2) are analyzed (step S909). In this case the destination addresses Dst are the global addresses of the wireless terminals MN1 and MN2 respectively. An interface for an external network is selected (step S910) and the encapsulated packets P (3-1) and P (3-2) are transmitted to the wireless terminal MN1 and MN2 (step S911). This completes the series of downstream procedures.

As explained above, in the first embodiment, two communication paths can be built for the down stream activity. One is a first communication path (file server 102 ⇒VPN server 101 ⇒wireless terminal MN3) and the other is a second communication path (file server 101 ⇒VPN server 101 ⇒wireless terminal MN2 ⇒wireless terminal MN3). Then the packet P3 from the file server 102 can be distributed and transferred.

This distributes the load without concentrating packets only to the wireless terminal MN1, and enables faster processing and lower power consumption of the wireless terminal MN1. Packets can be directly transferred from the wireless terminal MN2 to the wireless terminal MN3, thus reducing the load on a wireless LAN network compared with when transmitting a packet via the wireless terminal MN1. Therefore, even if the number of wireless terminals using the same channel increase, the throughput (effective transfer of network per unit hour) does not decrease.

Second Embodiment

The first embodiment is configured so that the translation process between the local address of the wireless terminal MN3 and the VPN address of the wireless terminal MN1 are executed by the address translation rule table T1. In addition to this, the second embodiment is configured so that a port number is translated as well. Therefore, the second embodiment is configured so that the wireless terminal MN1 generates and stores an address and port translation rule including the port number, and sends the rule to the wireless terminal MN2, whereas the first embodiment uses the address translation rule table T1.

FIG. 10 shows an address and port translation rule table T2 according to the second embodiment. The address and port translation rule table T2 in FIG. 10 has the source IP address 1001 and the source port number 1002 (both before translation), and corresponding IP address 1003 and a port number 1004 (both after translation), and a destination IP address 1005 and the destination port number 1006.

The translating unit 308 translates the source IP address 1001 and the source port number 1002 in the header of the packet P1 to obtain the IP address 1003 and the port number 1004 after translation, and then links them with the destination IP address 1005 (IP address of the destination file server 102) and the destination port number 1006, thereby generating the address and port translation rule T2.

Among the address and port translation rule T2, information on the source IP address 1001, the source port number 1002, the translated IP address 1003, and the destination IP address 1005 can be obtained at the wireless terminal MN1 serving as a gateway. Therefore, such information may be disseminated from the wireless terminal MN1 to MN2 at an appropriate timing before distributing packets from the VPN server 101. After the translated port number 1004 and the destination port number 1006 are written to the translated packet P2, the wireless terminal MN2 can receive the packet P2.

As explained above, by translating both the source IP address 1001 and the source port number 1002, the communication service requested by the VPN connection between the wireless terminal MN1 and the file server 102 is uniquely identified, and routing control for integrating routes for a plurality of sessions can be applied.

Third Embodiment

The third embodiment is configured so that a port number is embedded in a packet for transfer of the packet, whereas the second embodiment is configured so that address and port translation is performed by using the address and port translation rule T2.

Figure 11:
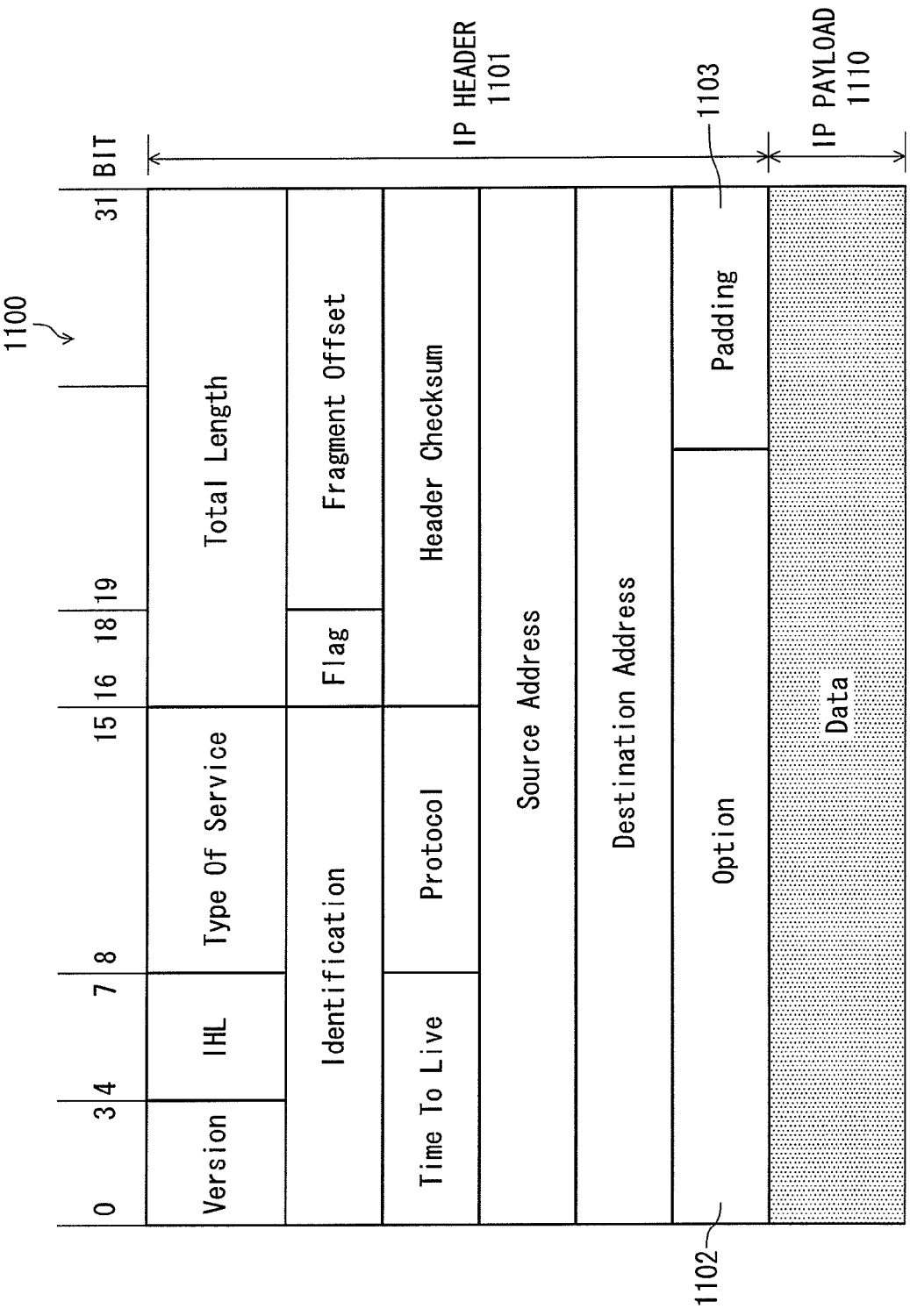
FIG. 11 shows a format (IPv4) of an IP datagram.

FIG. 11 shows a format (IPv4) of an IP datagram. In the IP datagram 1100, the reference numeral 1102 of an IP header 1101 shows an option field, and the reference numeral 1103 shows a padding field. The reference numeral 1101 shows an IP pay load. The source port number 1002 can be inserted in the option field 1102.

Figure 12:
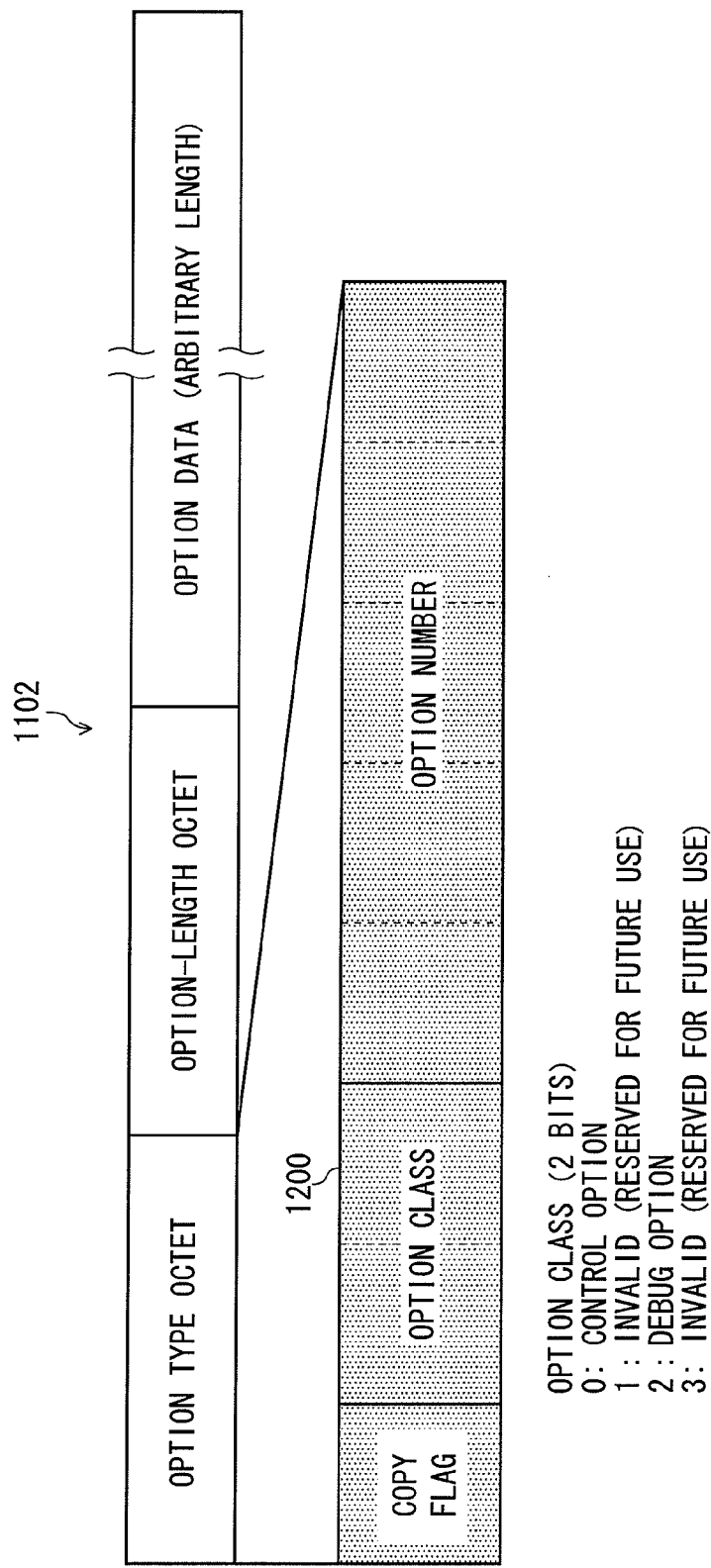
FIG. 12 shows a format of an option field.

FIG. 12 shows a format of an option field. The option field 1102 is not usually used but for a test or a debug. When values other than "0" or "2" are in the option class 1200, the value is ignored as incorrect.

Figure 13:
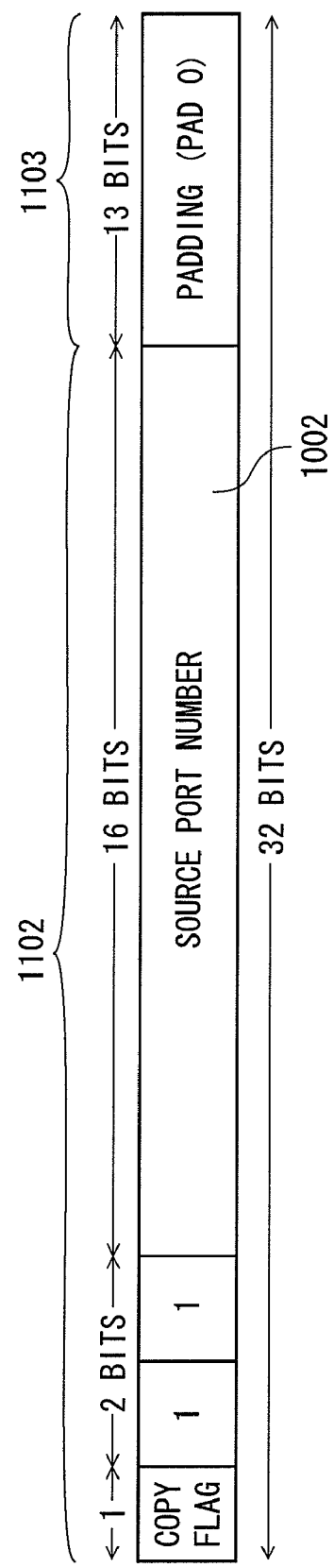
FIG. 13 shows a format of the option field and a padding field.

Then, by specifying "1" or "3" in the option class 1200, ordinary routers are ignored, and only the VPN server 101 and the wireless terminal MN1 serving as a gateway detects and uses the values as the source port 1002. The maximum of the source port number 1002 is 65535; therefore the maximum 16 bits are used. The option field and the padding field for this are shown in FIG. 13. FIG. 13 is an explanatory diagram showing a format of an option field 1102 and a padding field 1103. At this time, the header length and the packet length are corrected and the check sum is recalculated as well.

Figure 14:
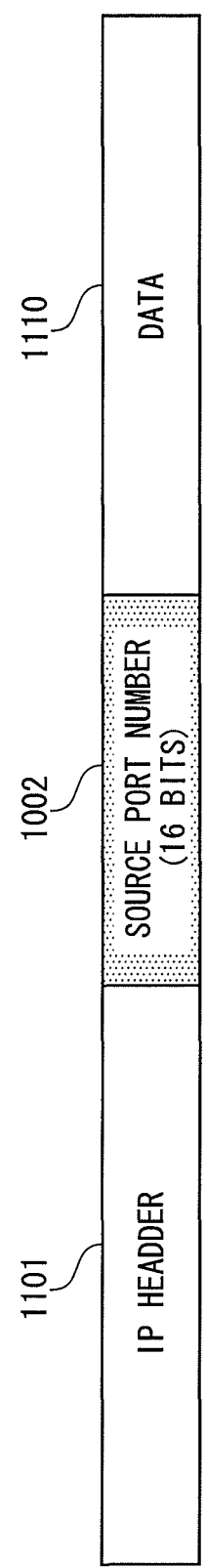
FIG. 14 shows an example of insertion of a source port number.

The source port number 1002 can be inserted either at the beginning or the end of the IP payload 1110 (See FIG. 11). The case when it is inserted at the beginning is illustrated. FIG. 14 shows an example of the insertion of the source port number 1002. In FIG. 14, when the source port number 1002 is inserted at the beginning of IP payload 1110, the packet length for the insertion is modified and the check sum is recalculated.

Now, the routing control method according to the third embodiment will be explained. First, in a communication within a local network LN, from the wireless terminal MN3 the wireless terminal MN1 designated as a gateway receives a packet P1 including the source port number 1002 and the destination port number 1006.

Then, the translating unit 308 of the wireless terminal MN1 translates the source IP address 1001 from the local address of the wireless terminal MN3 to the VPN address of the wireless terminal MN1. The source port number 1002 is translated as well, in this case, for example, to the port number defined by the wireless terminal MN2.

This means that for a packet P2 defined by the terminal MN2 from Packet P1, the source address Src is the VPN address of the wireless terminal MN1 which is IP address 1003 after translation. The translated port number 1004 is written to the packet P2. The destination IP address 1005 and the destination port number 1006 are the same as those of packet P1. The source port number 1002 before translation is inserted to the predetermined position in the packet P2.

The packet P2 is encapsulated at the wireless terminal MN1, and transmitted to the VPN server 101 as a packet P (2). The wireless terminal MN1 sends the global address of the wireless terminal MN2 to the VPN server 101, and the local address of the wireless terminal MN3 to the wireless terminal MN2.

The VPN server 101 decapsulates the packet P (2) and extracts the VPN address of the wireless terminal MN1, the translated IP address of which is 1003, the translated port number 1004, and the IP address of the file server 102, which is the destination IP address 1005, the destination port number 1006, and the source port number 1002 before translation.

By linking the extracted addresses and port numbers, the address and port translation rule table T2 is generated and stored. In the address and port translation rule table T2 generated by the VPN server 101, the source IP address 1001 (local address of the wireless terminal MN1) is a blank. The VPN server 101 transfers the packet P2, received as the extraction source, to the file server 102 to which the packet is addressed.

The file server 102 receives the packet P2 and transmits the packet P3 to the VPN server 101. The VPN server 101 judges whether or not the source address Src and the port number of the packet P3, and the destination address Dst and the port number comply with the address and port translation rule table T2.

More specifically, whether the following are matched or not is judged: the source address Src and the port number of the packet P3, and the destination IP address 1005 and the destination port number 1006 in the address and port translation rule T2; the destination address Dst and the port number of the packet P3, and the translated IP address 1003 and the translated port number 1004 in the address and port translation rule T2; and the destination port number 1006 embedded in the packet P3 and the source port number 1002 in the address and port translation rule T2.

Only when all of these are matched, the VPN server 101 encapsulates the packet P3 in the same manner as the first embodiment.

The encapsulated packets P (3-1) and P (3-2) are transmitted from the VPN server 101 to the wireless terminal MN1 and MN2 in the same manner as the first embodiment. The wireless terminals MN1 and MN2 decapsulate the packet P (3-1) and the packet P (3-2) and from the decapsulated P(3-1) and the P(3-2), the following are extracted respectively as in the VPN server 101: the destination IP address 1005 (IP address of the file server 102) and the destination port number 1006 written as the source address Src and the port number; and the translated IP address 1003 and the translated port number 1004 written as the destination address Dst and the port number, and the source port number 1002.

Then using the extracted information, the address and port translation rule for T2 is generated and stored.

For the source IP address 1001 which is a blank, the local address of the wireless terminal MN3 is written. Extracting the destination IP address 1005 (IP address of the file server 102) and the destination port number 1006 are not necessarily required.

The wireless terminal MN1 and MN2 respectively perform reverse translation by using this address and port translation rule T2. More specifically, the translated IP address 1003 and the translated port number 1004 written as the destination address Dst and the port number of the packet P3-1 are reversely translated to the source IP address 1001 (local address of the wireless terminal MN3), and the source port number 1002 written in the address and port translation rule T2.

Therefore, this reverse translation changes the destination address Dst and the port number of the packet P4-1 to the source IP address 1001 (local address of the wireless terminal MN3) and the source port number 1002 respectively, and then the packet P4-1 is transferred to the wireless terminal MN3. The same applies to the packet P3-2 and packet P4-2.

As explained above, the third embodiment is configured so that the address and port translation rule is generated by extracting information from the packet under transfer and then storing the rule. This configuration enables the routing control to integrate routes by always reflecting the latest address and port translation rule T2.

Fourth Embodiment

The first embodiment is configured so that the address translation rule table T1 generated at the wireless terminal MN1 serving as a gateway is sent to the wireless terminal MN2 within the same local network, so that a header address of a packet from the VPN server 101 is reversely translated at the wireless terminal MN2 and the packet is directly transferred to the wireless terminal MN3. The fourth embodiment is configured so that an address translation rule table T1 generated at the wireless terminal MN1 serving as a gateway is sent to the VPN server 101, and a header address of a packet is reversely translated at the VPN server 101.

Therefore, the functional configuration of the wireless terminal MN1 is the same as that shown in FIG. 3. However, the wireless terminal MN2 does not require the translating unit 308, the storing translation rule unit 309, and the managing translation rule unit 310. The functional configuration of the wireless terminal MN2 will be the same as that shown in FIG. 3 when either of the wireless terminals MN1 and MN2 is a gateway.

Since an address translation is performed at the VPN server 101, the functional configuration of the VPN server 101 has a translating unit 608 and a storing translation rule unit 609 in addition to the functions shown in FIG. 6.

Figure 15:
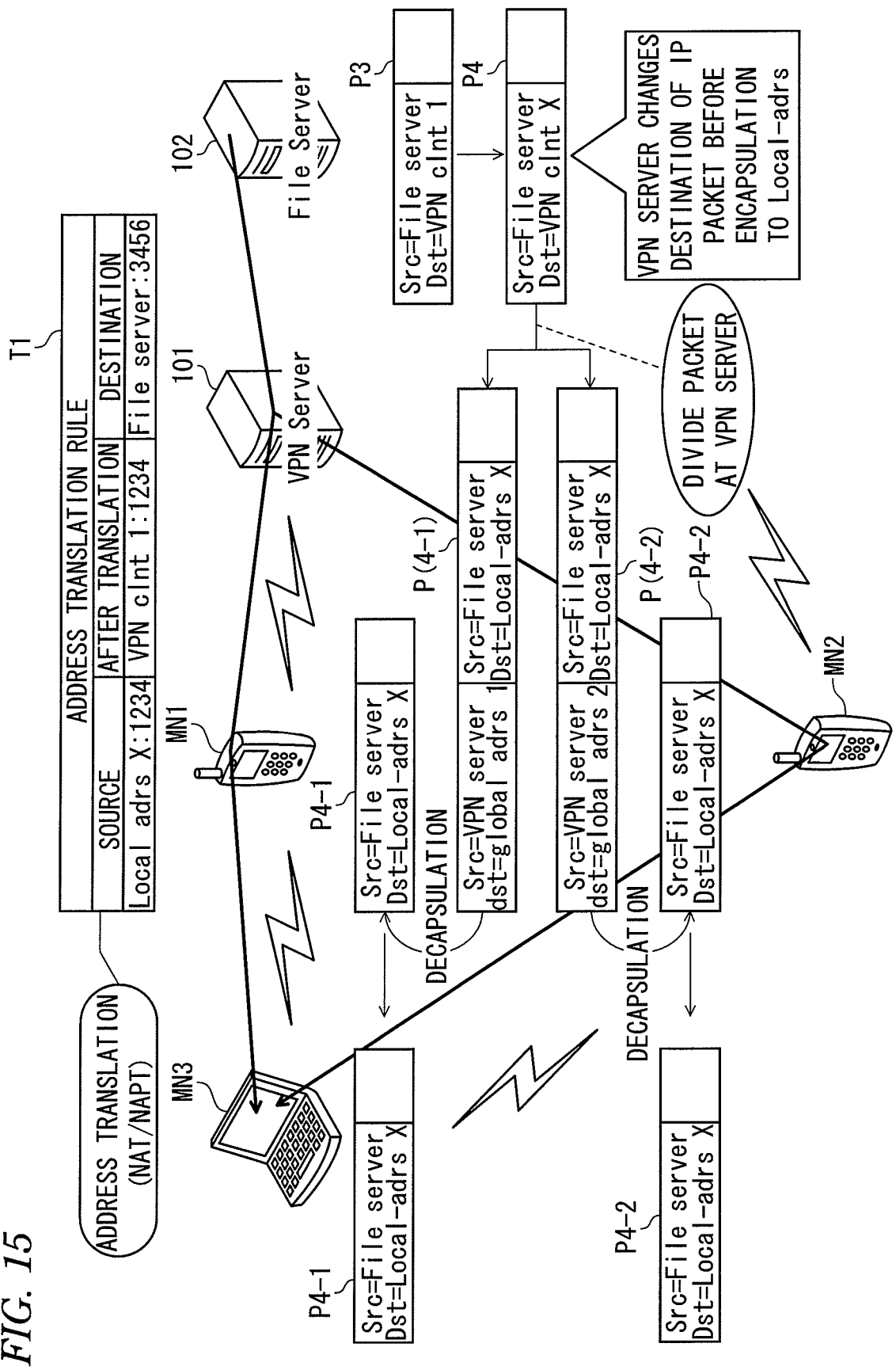
FIG. 15 shows a downstream routing control method for the fourth embodiment.

FIG. 15 shows a downstream routing control method of the fourth embodiment of this invention. An upstream routing control method is the same as the upstream routing control method shown in FIG. 1 except that the address translation rule table T1 is sent to the VPN server 101 instead of the wireless terminal MN2. Therefore it is not shown.

In FIG. 15, the VPN server 101 stores the address translation rule table T1 sent by the wireless terminal MN1 serving as a gateway. When the file server 102 receives the packet P2, it transmits the packet P3 of the requested data to the VPN server 101.

The VPN server 101 reads the address translation rule sent by the gateway (wireless terminal MN1), and reversely translates the destination address Dst of the packet P3 from the VPN address (Dst=VPN server) of the wireless terminal MN1 to the local address (Dst=Local adrs X) of the wireless terminal MN3.

After that, the VPN server 101 divides the reversely translated packet P4 and encapsulates them by referring to the routing table. The encapsulated packets P (4-1) and P (4-2) are transmitted to the wireless terminals MN1 and MN2, respectively.

The wireless terminals MN1 and MN2 decapsulate the received packets P (4-1) and P (4-2) respectively. The destination address Dst of the header of decapsulated packets P (4-1) and P (4-2) are the local address (Dst=Local adrs X) of the wireless terminal MN3, so the packets are directly transmitted to the wireless terminal MN3.

This distributes the load of the wireless terminal MN1 in the same way as the first embodiment, and enables faster processing and lower power consumption of the wireless terminal MN1. A packet can be directly transferred from the wireless terminal MN2 to the wireless terminal MN3, thus reducing the use of the wireless LAN network compared with when transmitting via the wireless terminal MN1. Therefore, even if the wireless terminals which use the same channel increase, the throughput (effective transfer of network per unit hour) will not decrease.

Fixing the wireless terminal MN1 as a gateway eliminates the need for the address translation at other wireless terminal MN2. Therefore, a wireless terminal without an address translation function can be used as the second communication path. Eliminating the address translation realizes lower price than that of the wireless terminal MN1.

(The Functional Configuration of the VPN Server 101)

Figure 16:
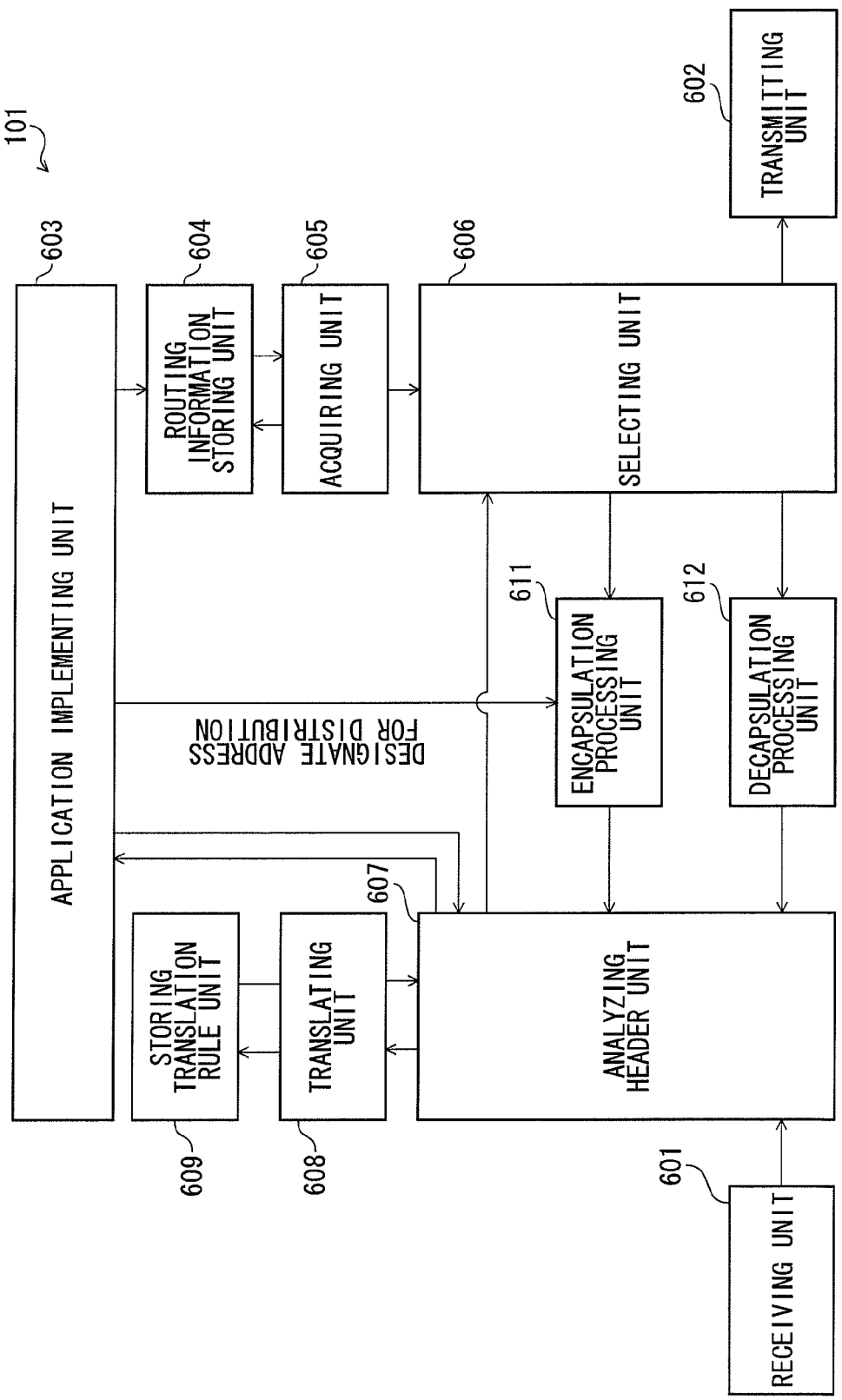
FIG. 16 shows a functional configuration of a VPN server for the fourth embodiment.

FIG. 16 shows a functional configuration of a VPN server of the fourth embodiment. When the functions are the same as those shown in FIG. 6, the same reference numerals as those in FIG. 6 are assigned to functions in FIG. 16 as well, and explanations for these functions are omitted here. The translating unit 608 translates the source address. For example, the source address Src is translated from the local network LN address (private address) to the VPN address assigned to the wireless terminal MN1.

Reverse to the above process, the source address Src is translated from the VPN address assigned to the wireless terminal MN 1 to the local network LN address (private address). This generates the address translation rule table T1 shown in FIG. 1 and FIG. 2. The storing translation rule unit 609 stores the address translation rule table T1. The address translation rule table T1 is a memory table (translation table) storing the address translation rule table T1.

(Processing Procedure for the Wireless Terminal MN1 and MN2)

Figure 17:
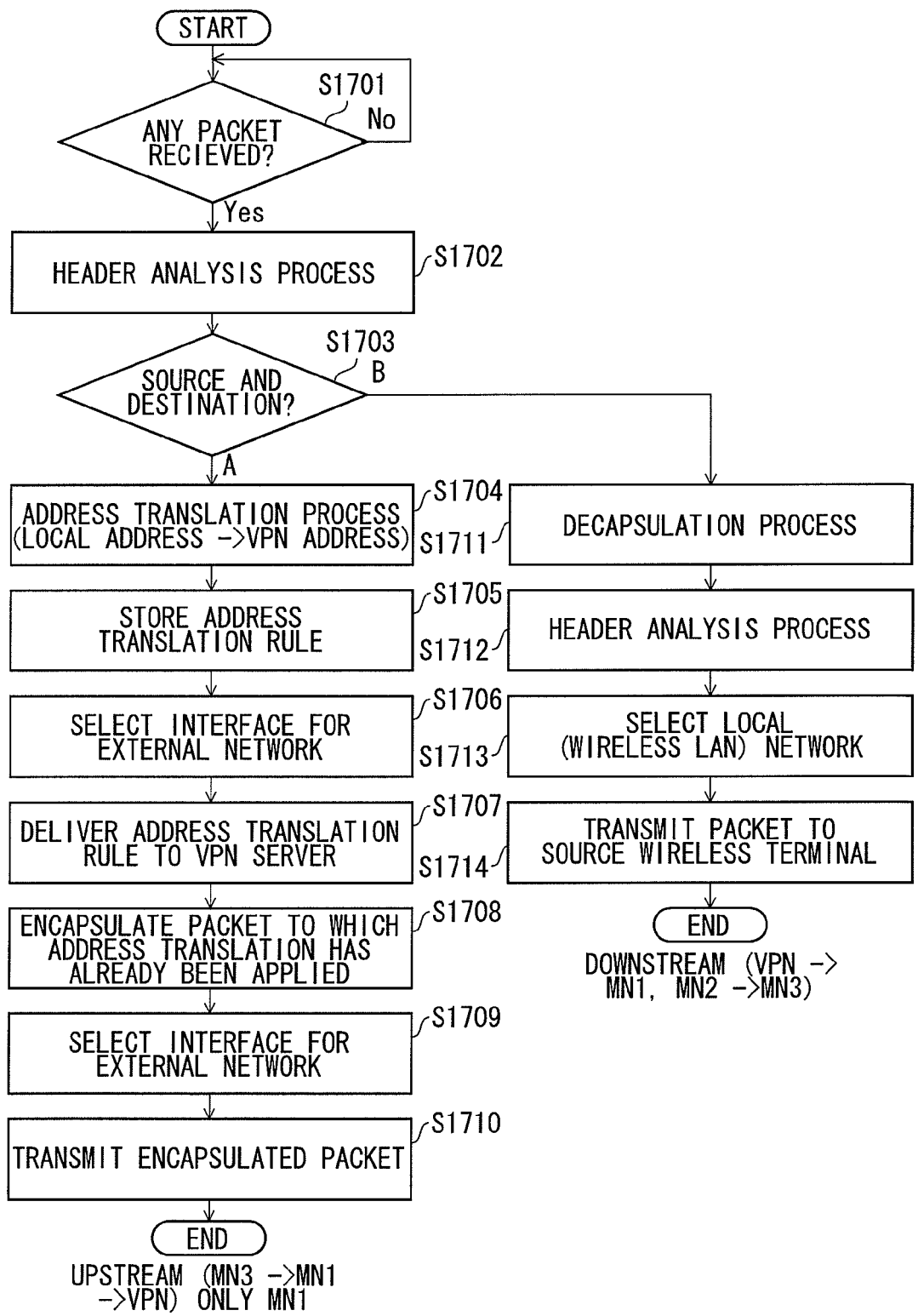
FIG. 17 shows processing procedures of wireless terminals MN1 and MN2 for the fourth embodiment.

The processing procedure for the wireless terminals MN1 and MN2 of the fourth embodiment will be explained. FIG. 17 is a flow chart showing a processing procedure for the wireless terminal MN1, and the wireless terminal MN2. In FIG. 17, first, whether or not any packet is received is judged (step S1701). When no packet is received (step S1701: No), MN1 and MN2 stand by until a packet is received.

When any packet is received (step S1701: Yes), the header is analyzed (step S1702). When the analysis reveals that the source is the wireless terminal MN3 and the destination is the file server 102 of the remote network RN (Step S1703:A), the operation transits to Step S1704. Otherwise (step S1703: B), it transits to Step S1711.

Steps from S1704 to S1710 are the upstream procedure for the wireless terminal MN1 designated as a gateway (MN1→VPN server 101), while steps S1711 to S1714 are the downstream procedure for the wireless terminals MN1 and MN2 (VPN server 101→MN1, MN2). First, steps S1704 to S1710 will be explained.

In step S1703, when the header analysis reveals that the source is the wireless terminal MN3 and the destination is the file server 102 of the remote network RN (Step S1703: A), address translation by NAT is executed (Step S1704). Then the address translation rule table T1 linking the source addresses Src before and after the translation and the destination address Dst of the packet P1 is stored (Step 1705).

After that an interface for an external network is selected (step S1706) by referring to the routing table, and then the address translation rule table T1 is transmitted to the VPN server 101 (step S1707).

Then, the packet P2 to which the address translation has already been applied is encapsulated (step S1708) and a packet P (2) is obtained. When the header of the packet P(2) is referred to, the destination is the VPN server 101. The selecting unit 606 selects an interface for an external network (step S1709) and transmits the encapsulated packet P(2) to the VPN server 101 (step S1710). This completes the upstream processing procedures.

Now, the downstream process will be explained. In step S1703, when the source address Src is the VPN server 101 and the destination address Dst is the global address of the terminal itself (wireless terminal MN1 or MN2) (step S1703:B), then the decapsulation process is executed for a packet P (4-1), and a P(4-2) (step S1711).

Then the headers of decapsulated packets P (4-1), and P (4-2) are analyzed (step S1712). In this case the destination address Dst is the local address of the wireless terminal MN3. A local interface is selected (step S1713), and the decapsulated packet P (4-1) for the wireless terminal MN1, and the decapsulated packet P (4-2) for the wireless terminal MN2 are transmitted to the wireless terminal MN3. This completes the downstream procedures.

(Processing Procedures for the VPN Server 101)

Figure 18A:
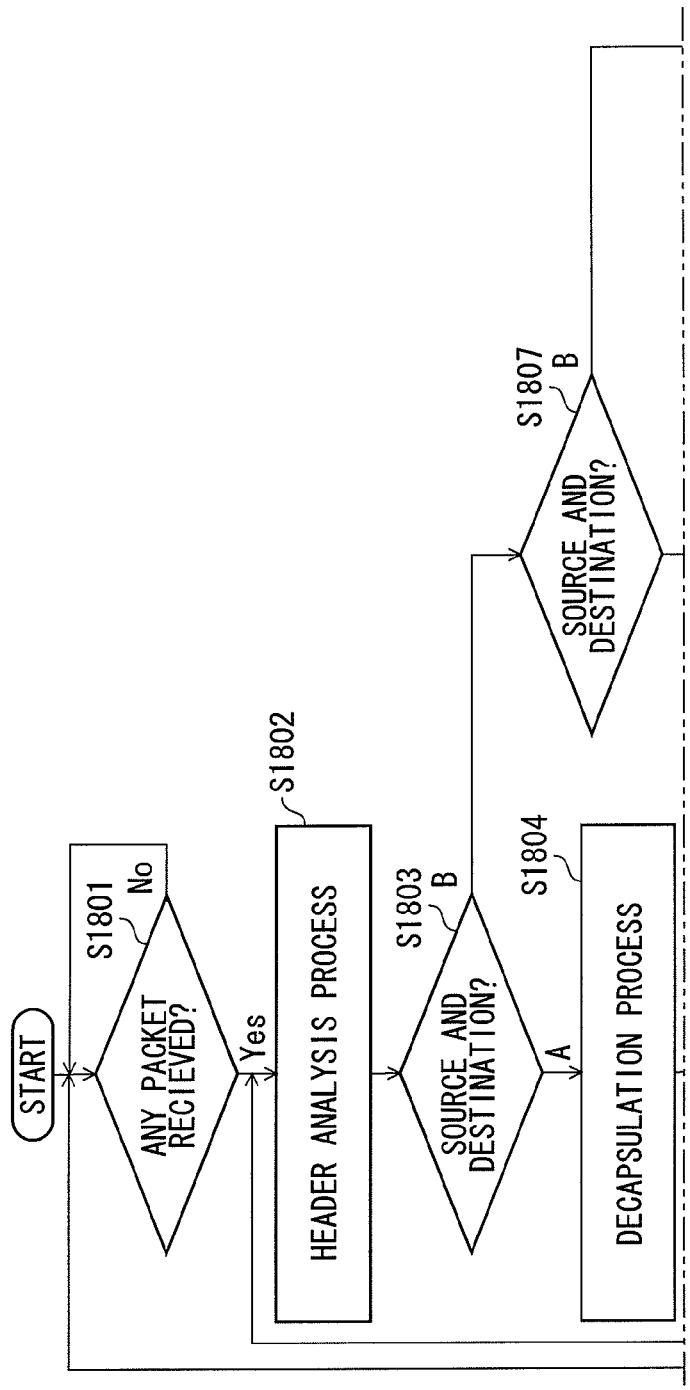
FIG. 18 is a flow chart showing processing procedures of a VPN server for the fourth embodiment.
Figure 18B:
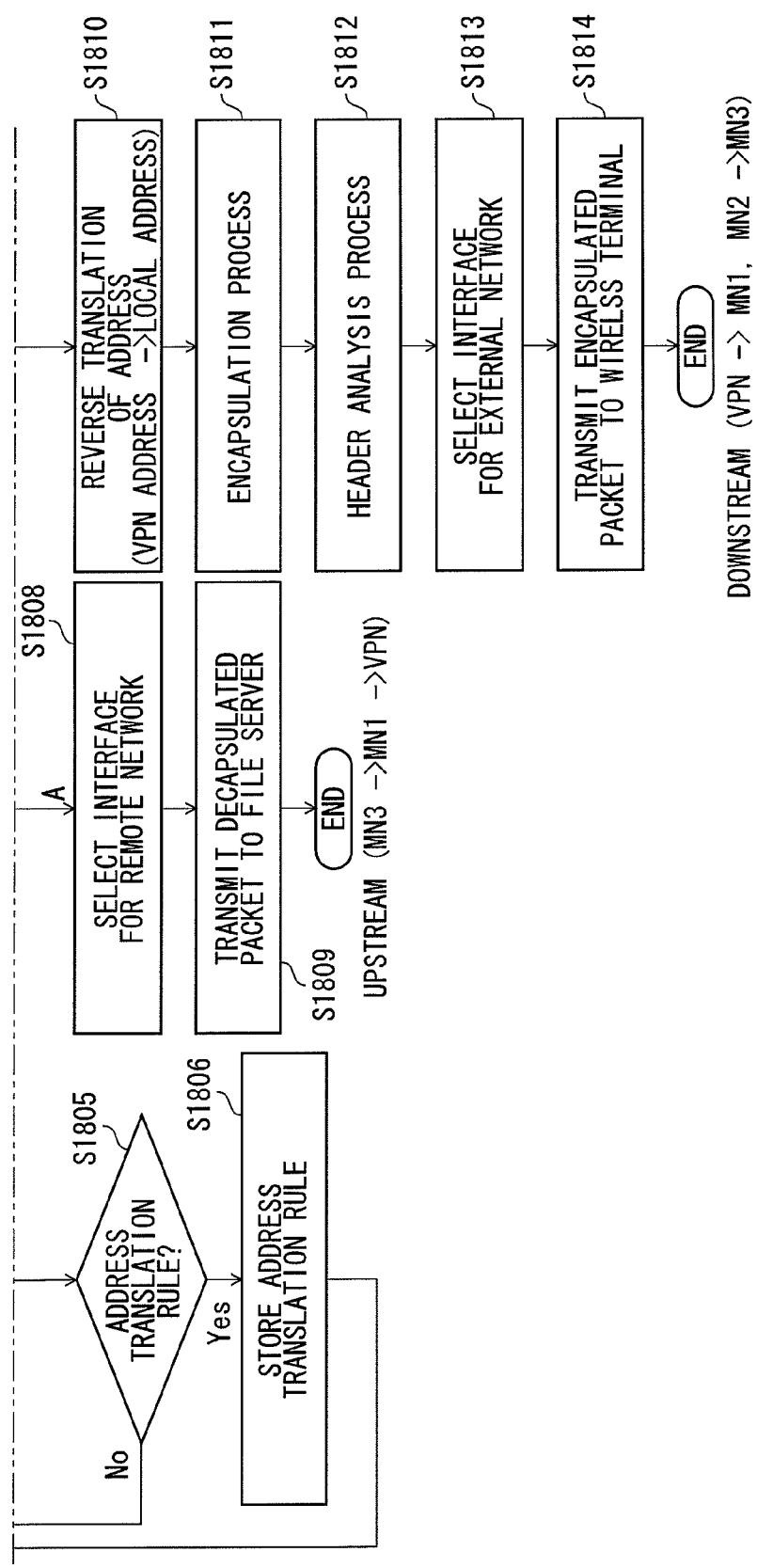
Figure 19:
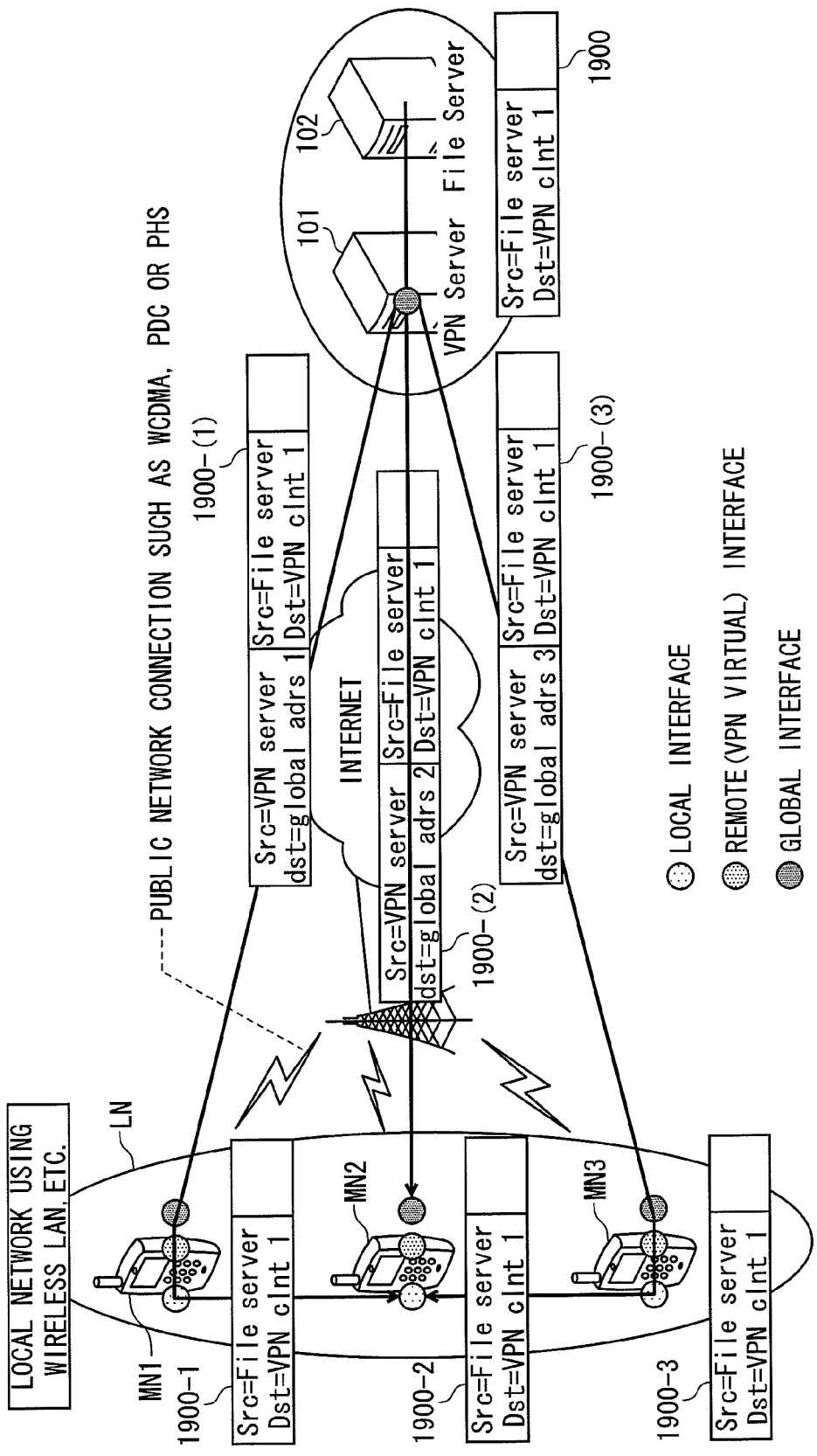
FIG. 19 shows an exemplary conventional configuration for integrating a plurality of routes.

Now, the processing procedures for the VPN server 101 will be explained. FIG. 18 is a flow chart showing processing procedures for the VPN server 101 of the fourth embodiment. In FIG. 18, first, whether any packet is received or not is determined (step S1801). When no packet is received (step S1801: No), the VPN server 101 stands by until a packet is received.

When a packet is received (step S1801: Yes), the header is analyzed (step S1802). When the header analysis reveals that the source address Src is a global address of the gateway (the wireless terminal MN1), and the destination address Dst is the VPN server 101 (step S 1803:A), the packet has been encapsulated. Therefore, decapsulation is executed (step S1804).

After that, whether the packet is the address translation rule table T1 or not is judged (step S1805) If it is the address translation rule table T1 (step S1805:Yes), the address translation rule table T1 is stored (step S1806), and the operation returns to the step S1801. If it is not the address translation table T1 (Step S1805: No), the operation returns to the step 1802.

In step S1803, when the source address Src is the global address of the gateway (the wireless terminal MN1), and the destination address Dst is not the address of the VPN server 101 (step S1803:B), the operation transits to the step S1807. The steps S1807 to S1809 are the upstream procedure, whereas the steps S1807, and S1810 to S1814 are the downstream procedure. First, the upstream procedure for steps from S1807 to S1809 will be explained.

In the step S1807, the source address Src is the VPN address of the wireless terminal MN1 serving as a gateway, and the destination address Dst is the address of the file server 102 (step S1807: A). The packet P2 is the request for the file server 102, an interface for a remote network is selected (step S1808), and the packet P2 decapsulated at the step S1804 is transmitted to the file server 102 (step S1809). This completes the upstream procedures.

Next, the downstream procedures of steps S1807 and S1810 to S1814 will be explained. In step S1807, the source address Src is the address of the file server 102, and the destination address Dst is the VPN address of the wireless terminal MN1 serving as a gateway (step S1807:B). The packet P3 is the data requested by the wireless terminal MN3 via the gateway (wireless terminal MN1). Therefore the destination address Dst of the header of the packet P3 is reversely translated by referring to the address translation rule table T1 stored at step S1806 and a packet P4 is obtained (step S1810).

After that, the packet P4 is divided between the wireless terminal MN1 and MN2 respectively by referring to the routing table and then encapsulation is applied to these packets (step S1811). Then the header of the encapsulated packet P (4-1) and P (4-2) are analyzed (step S1812).

In this case, the destination addresses Dst are the global addresses of the wireless terminal MN1 and MN2 respectively. An interface for an external network is selected (step S1813) and the encapsulated packets P (4-1), and P (4-2) are transmitted to the wireless terminals MN1 and MN2 respectively (step S1814). This completes the downstream procedures.

As explained above, in the fourth embodiment in the same way as in the first embodiment, two communication paths are built for the down stream process. One is a first communication path (file server 102 ⇒VPN server 101 ⇒wireless terminal MN1 ⇒wireless terminal MN3) and the other is a second communication path (file server 102⇒VPN server 101 ⇒wireless terminal MN2 ⇒wireless terminal MN3). Then packets from the file server 102 can be distributed and transferred.

This distributes the load without concentrating packets only to the wireless terminal MN1, and enables faster processing and lower power consumption of the wireless terminal MN1. A packet can be directly transferred from the wireless terminal MN2 to the wireless terminal MN3, thus reducing the use of a wireless LAN network compared with when transmitting via the wireless terminal MN1. Therefore, even if the wireless terminals using the same channel increase, the throughput (effective transfer of network per unit hour) will not decrease.

Fixing the wireless terminal MN1 as a gateway eliminates the need for the address translation at another wireless terminal MN2. Therefore, a wireless terminal without an address translation function can be used as the second communication path. Eliminating the address translation realizes lower price than that of the wireless terminal MN1.

The Fifth Embodiment

Now, the fifth embodiment will be explained. The first embodiment is configured so that the translation process between the local address of the wireless terminal MN3 and the VPN address of the wireless terminal MN1 are executed by the address translation rule table T1.

Therefore the translating unit 608 of the wireless terminal MN1 translates the source IP address 1001 and the source port number 1002 in the header of the packet P1 to obtain the translated IP address 1003 and the translated port number 1004 respectively and then links them with the IP address 1005 (IP address of the destination file server 102) and the destination port number 1006, thereby generating the address and port translation rule T2. The address and port translation rule table T2 is transmitted to the VPN server 101 as well.

As explained above, by translating both the source IP address 1001 and the source port number 1002, the communication service requested by VPN connection between the wireless terminal MN1 and the file server 102 is uniquely identified, and routing control for integrating routes for a plurality of sessions can be applied.

Sixth Embodiment

The sixth embodiment is configured so that a port number is embedded in a packet and transferred, whereas the fifth embodiment is configured so that translation for an address and a port is performed by using the address and port translation rule T2. Embedding a port number is the same as that of the third embodiment; therefore the explanation is omitted in describing the sixth embodiment. The routing control method according to the sixth embodiment will be explained.

First, in a communication within a local network LN, the wireless terminal MN1 designated as a gateway receives a packet P1 which includes the source port number 1002 and the destination port number 1006 from the wireless terminal MN3.

Then, the translating unit 608 of the wireless terminal MN1 translates the source IP address 1001 from the local address of the wireless terminal MN3 to the VPN address of the wireless terminal MN1. The source port number 1002 is translated as well, in this case (for example, to the port number defined by the wireless terminal MN2).

This means that in the packet P2, the source address Src is the VPN address of the wireless terminal MN1 which is the translated IP address 1003. The translated port number 1004 is written to the packet P2. The destination IP address 1005 and the destination port number 1006 are the same as those of packet P1. The source port number 1002 before translation is inserted to the predefined position in the packet P2.

The packet P2 is encapsulated at the wireless terminal MN1, and transmitted to the VPN server 101 as the packet P (2). The wireless terminal MN1 sends the global address of the wireless terminal MN2 and the local address of the wireless terminal MN3 to the VPN server 101.

The VPN server 101 decapsulates the packet P(2) and extracts the VPN address of the wireless terminal MN1, the translated IP address of which is 1003, the translated port number 1004, and the IP address of the file server 102 which is the destination IP address 1005, the destination port number 1006, and the source IP address 1001 before translation and the source port number 1002 before translation.

By linking the extracted address and port numbers, the address and port translation rule table T2 is generated and stored. The VPN server 101 transfers the packet P2 served as the extraction source to the file server 102 to which the packet is addressed.

The file server 102 receives the packet P2 and transmits the packet P3 to the VPN server 101. The VPN server 101 judges whether the source address Src and the port number of the packet P3, and the destination address Dst and the port number comply with the address and port translation rule table T2 or not.

More specifically, whether the following are matched or not is judged: the source address Src and the port number of the packet P3, and the destination IP address 1005 and the destination port number 1006 in the address and port translation rule T2; the destination address Dst and the port number of the packet P3, and the translated IP address 1003 and the translated port number 1004 in the address and port translation rule T2; and the destination port number 1006 embedded in the packet P3 and the source port number 1002 in the address and port translation rule T2.

Only when all of these are matched, reverse translation using the address and port translation rule table T2 is applied. More specifically, the following are extracted from the packet P4:

the destination IP address 1005 (IP address of the file server 102) and the destination port number 1006 written as the source address Src and the port number; and the translated IP address 1003 and the translated port number 1004 written as the destination address Dst and the port number, and the source port number 1002. Then using the extracted information, the address and port translation rule T2 is generated and stored. The destination IP address 1005 (IP address of the file server 102) and the destination port number 1006 are not necessarily extracted.

The VPN server 101 translates reversely by using the address and port translation rule T2. More specifically, according to the address and port translation rule T2, the translated IP address 1003 and the translated port number 1004 written as the destination address Dst and the port number of the packet 3 are reversely translated to the source IP address 1001 (local address of the wireless terminal MN3) and the source port number 1002 written in the address and port translation rule T2.

This means that the packet P3 is reversely translated to the packet P4 at the VPN server 101. The reversely translated packet P4 is encapsulated as in the fourth embodiment, and transmitted to the wireless terminal MN1 and MN2 as packets P (4-1) and P (4-2) respectively.

At the wireless terminal MN1 and MN2, the packets P(4-1) and P(4-2) are decapsulated, and the destination address Dst and the port number are changed to the source IP address 1001 (the local address of the wireless terminal MN3) and the source port number 1002 respectively and transferred to the wireless terminal MN3 as the packets P4-1 and P4-2.

As explained above, the sixth embodiment is configured so that the address and port translation rule table T2 is generated and stored by extracting the information from packets under transfer. This enables the routing control for integrating routes by always reflecting the latest address and port translation rule table T2 without performing reverse translation at the wireless terminals MN1 and MN2.

As explained above, according to the embodiments 1 to 6, two communication paths can be built for the down stream. One is a first communication path (file server 102 ⇒VPN server 101 ⇒wireless terminal MN1 ⇒wireless terminal MN3) and the other is a second communication path (file server 102 ⇒VPN server 101 ⇒wireless terminal MN2 ⇒wireless terminal MN3). Then the routes can be integrated from each terminal device (wireless terminal MN1 and MN2) to a specific terminal device.

Therefore, virtually increasing communication paths has an effect that the load for packet transfer is distributed by a plurality of routes, and enables faster packet transfer. For example, when the number of N−1 wireless terminals 2 exist in a local network LN, assuming that packets are equally distributed, the number of N communication paths are set (the first communication path is one, and the second communication path is N−1). Therefore, the CPU load of the wireless terminals MN1 and MN2 will be 1/N respectively compared with the method shown in the conventional technology.

The usage rate R of the wireless resource within the local network LN is obtained by the equation below (1)

$$R = N/\{1+2\times(N-1)\} \quad (1)$$

This reduces the load to the wireless terminal MN1 serving as a gateway, and the redundant use of wireless resources can be avoided. Although the above mentioned embodiments from the first to the sixth use the wireless terminals from MN1 to MN3, a configuration employing a wired network may be used instead of these wireless communication.

The packet routing control method explained in this embodiment is realized by executing a prepared program by a computer including a personal computer, a work station, and a portable terminal. This program is stored in computer readable media which include a hard disk, a flexible disk, a compact disk read-only-memory (CD-ROM), a magnet optical disk (MO), and a digital video disk (DVD). Such program is executed by being read by a computer. This program may be transmission media distributable through a network such as the Internet.

The wireless terminal MN1 and the VPN server 101 explained in this embodiment may be realized by an integrated circuit (IC) for a specific application (hereunder, simply called an "ASIC") such as a standard cell, structured Application Specific Integrated Circuit (ASIC), or custom LSI such as Programmable Logic Device (PLD) including FPGA. More specifically, for example, an applicable process among the above mentioned packet routing methods can be realized by defining functions by HDL description, synthesizing the logic of the description, and provides them to custom LSI such as ASIC or PLD.

What is claimed is:

1. A packet routing control method, wherein a local network in which a plurality of terminal devices equipped with a communication device for local and external networks are provided and a remote network in which a Virtual Private Network (VPN) server and a file server exist are VPN-connected through VPN addresses, thereby setting a communication path between the file server and a specific terminal device equipped only with a communication device for the local network includes the following processes:

designating one of the terminal devices as a gateway among the plurality of terminal devices, the gateway having one of the VPN addresses and an Internet Protocol (IP) address, the gateway receiving a first packet from the specific terminal device, wherein a source address of the first packet is a local address of the specific terminal device and a destination address of the first packet is an Internet Protocol (IP) address of the file server;

the gateway translating the source address described in a header of the received first packet from the local address of the specific terminal device to the VPN address of the gateway;

the gateway storing an address translation rule linking the local address, the VPN address of the gateway and the IP address of the file server;

the gateway providing the address translation rule to another terminal device other than the gateway, and providing global addresses of the gateway and the another terminal device to the VPN server;

the file server transmitting a second packet which is a response to the first packet, so that when the VPN server receives the second packet in which the source address is the IP address of the file server, and the destination address is the VPN address of the gateway, the packet is distributed to each of the global addresses and encapsulated by using a header, the source address of which is the IP address of the gateway and the destination address of which is the global address of the or the another terminal device, the gateway and the another terminal device concurrently receiving encapsulated packets respectively, and decapsulating the received encapsulated packets, the gateway and the another terminal device reversely translating the destination address described in the header of the decapsulated packets from the VPN address to the local address respectively, the gateway and the another terminal device transmitting the decapsulated packets by reverse translation to the specific terminal device;

wherein the gateway provides the address translation rule to the another terminal device via the local network.

2. The packet routing method according to claim 1, wherein the gateway provides the address translation rule to the another terminal device through the VPN server.

3. The packet routing method according to claim 1, wherein when the gateway stores the address translation rule linking the local address, the gateway uses the address translation rule to link the source IP address and the source port number in the header of the first packet to obtain the IP address and the port number of the gateway, and uses the destination IP address and the destination port number in the header of the first packet to obtain the IP address of the file server respectively.

4. The packet routing method according to claim 3, wherein
the gateway provides the address translation rule to the another terminal device via the local network.

5. The packet routing method according to claim 3, wherein
the gateway provides the address translation rule to the another terminal device through the VPN server.

6. The packet routing method according to claim 1, wherein
when the gateway provides the address translation rule to the another terminal device, the gateway provides port information including a source port number in the header of the first packet, the port number of the gateway, the destination port number also being provided in the header of the first packet, and the destination port of the file server being provided to the VPN server,
the VPN server making a port number translation rule using the port information received from the gateway,
and the VPN server providing the port number translation rule to the gateway and the another terminal device.

7. The packet routing method according to claim 6, wherein the gateway provides the address translation rule to the another terminal device via the local network.

8. The packet routing method according to claim 6, wherein the gateway provides the address translation rule to the another terminal device through the VPN server.

9. A packet routing control system, wherein a local network in which a plurality of terminal devices equipped with a communication device for local communication and at least one external network are provided, and a remote network in which a Virtual Private Network (VPN) server and a file server exist are VPN-connected through VPN addresses, thereby setting a communication path between the file server and a specific terminal device equipped only with a communication device for the local network, comprising:

a receiving unit designating one of the terminal devices as a gateway among the plurality of terminal devices, the gateway having one of the VPN addresses and an Internet Protocol (IP) address, the receiving unit receiving a first packet from the specific terminal device, wherein a source address of the first packet is a local address of the specific terminal device and a destination address of the first packet is an IP address of the file server;

a managing translation rule unit of the gateway translating the source address described in a header of the received first packet from the local address of the specific terminal device to the VPN address of the gateway;

a translating unit of the gateway storing an address translation rule linking the local address, the VPN address of the gateway and the IP address of the file server;

the managing translation unit providing the address translation rule to another terminal device other than the terminal device designated as the gateway, and providing global addresses of the gateway and the another terminal device to the VPN server;

an encapsulation processing unit encapsulating a second packet in which a source address is the IP address of the file server, and the destination address is the VPN address of the gateway, the packet is distributed to each of the global addresses and encapsulated by using a header, the source address of which is the IP address of the gateway and the destination address of which is the global address of the gateway or the another terminal device when receiving the second packet from the file server;

encapsulation units of the gateway and the another terminal device concurrently receiving encapsulated packets respectively, and decapsulating the received encapsulated packets, decapsulation units of the gateway and the another terminal device reversely translating the destination address described in the header of the decapsulated packets from the VPN address to the local address respectively, and transmitting units of the gateway and the another terminal device transmitting the packet the destination address of which is changed to the local address by reverse translation to the specific terminal device;

wherein the gateway provides the address translation rule to the another terminal device via the local network.

* * * * *